United States Patent
Kono

(10) Patent No.: US 10,079,945 B2
(45) Date of Patent: Sep. 18, 2018

(54) INFORMATION PROVIDING APPARATUS, INFORMATION PROVIDING SYSTEM, AND NON-TRANSITORY COMPUTER READABLE MEDIUM

(75) Inventor: Daisuke Kono, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 745 days.

(21) Appl. No.: 13/560,429

(22) Filed: Jul. 27, 2012

(65) Prior Publication Data

US 2013/0250347 A1    Sep. 26, 2013

(30) Foreign Application Priority Data

Mar. 26, 2012  (JP) ................. 2012-068752

(51) Int. Cl.
   *H04N 1/00* (2006.01)
(52) U.S. Cl.
   CPC ..... *H04N 1/00204* (2013.01); *H04N 1/00408* (2013.01); *H04N 2201/001* (2013.01); *H04N 2201/0094* (2013.01)
(58) Field of Classification Search
   None
   See application file for complete search history.

(56) References Cited

U.S. PATENT DOCUMENTS

| | | | | |
|---|---|---|---|---|
| 6,226,096 | B1 * | 5/2001 | Ouchi | G06K 15/00 358/1.14 |
| 6,567,175 | B1 * | 5/2003 | Lee | 358/1.14 |
| 8,218,179 | B2 | 7/2012 | Nakajima | |
| 8,482,774 | B2 | 7/2013 | Okada et al. | |

(Continued)

FOREIGN PATENT DOCUMENTS

| | | |
|---|---|---|
| CN | 1575460 A | 2/2005 |
| JP | 2000-057042 A | 2/2000 |

(Continued)

OTHER PUBLICATIONS

Communication dated Oct. 8, 2013 from the Japanese Patent Office in counterpart application No. 2011-225306.
Communication dated Dec. 13, 2017 from the State Intellectual Property Office of the P.R.C. in counterpart Chinese application No. 201210376987.8.

*Primary Examiner* — Lennin Rodriguezgonzale
(74) *Attorney, Agent, or Firm* — Sughrue Mion, PLLC

(57) ABSTRACT

An information providing apparatus including an image processing unit, a receiving unit, a selection unit, and a transmitting unit. The image processing unit executes image processing. The receiving unit receives first operation state information indicating an operation state of a terminal apparatus from the terminal apparatus. The selection unit acquires second operation state information indicating an operation state relating to image processing being executed by the image processing unit. Upon detecting that the terminal apparatus is in a specific operation state in accordance with the first operation state information, the selection unit selects one or plural pieces of user interface information concerning image processing to be executable after the specific operation state, in accordance with the first operation state information and the second operation state information. The transmitting unit transmits the one or plural pieces of user interface information selected by the selection unit to the terminal apparatus.

17 Claims, 11 Drawing Sheets

(56) References Cited

U.S. PATENT DOCUMENTS

| | | |
|---|---|---|
| 8,749,823 B2 | 6/2014 | Kato |
| 2002/0078116 A1* | 6/2002 | Aoki ................. G06F 9/4843 718/100 |
| 2004/0070591 A1 | 4/2004 | Kato |
| 2007/0124512 A1 | 5/2007 | Park |
| 2007/0229891 A1 | 10/2007 | Yanagi et al. |
| 2008/0186536 A1 | 8/2008 | Shimizu |
| 2008/0192281 A1 | 8/2008 | Hagiwara |
| 2010/0054762 A1* | 3/2010 | Kim ................................... 399/8 |
| 2010/0079804 A1* | 4/2010 | Otsuka ................ G06F 3/1294 358/1.15 |
| 2010/0156975 A1* | 6/2010 | Morooka ....................... 347/14 |
| 2010/0253976 A1* | 10/2010 | Kasai ..................... G06F 3/1204 358/1.15 |
| 2010/0290068 A1 | 11/2010 | Okada et al. |
| 2010/0290074 A1 | 11/2010 | Kuroishi et al. |
| 2010/0293400 A1 | 11/2010 | Kuroishi et al. |
| 2011/0063663 A1* | 3/2011 | Kim ..................... G06F 3/1206 358/1.15 |
| 2012/0030615 A1* | 2/2012 | Urashima ..................... 715/794 |
| 2012/0070090 A1* | 3/2012 | Chang ..................... G06K 9/00 382/218 |
| 2013/0095890 A1 | 4/2013 | Kono |
| 2013/0163044 A1* | 6/2013 | Suzuki ................. G06F 3/1296 358/1.15 |
| 2013/0250347 A1 | 9/2013 | Kono |

FOREIGN PATENT DOCUMENTS

| | | |
|---|---|---|
| JP | 2002-509631 A | 3/2002 |
| JP | 2004-152276 A | 5/2004 |
| JP | 2007-532056 A | 11/2007 |
| JP | 2008-210383 A | 9/2008 |
| JP | 2009-187176 A | 8/2009 |
| JP | 2009-217508 A | 9/2009 |
| JP | 2010-268346 A | 11/2010 |
| WO | 99/30257 A1 | 6/1999 |
| WO | 2005/117295 A1 | 12/2005 |

* cited by examiner

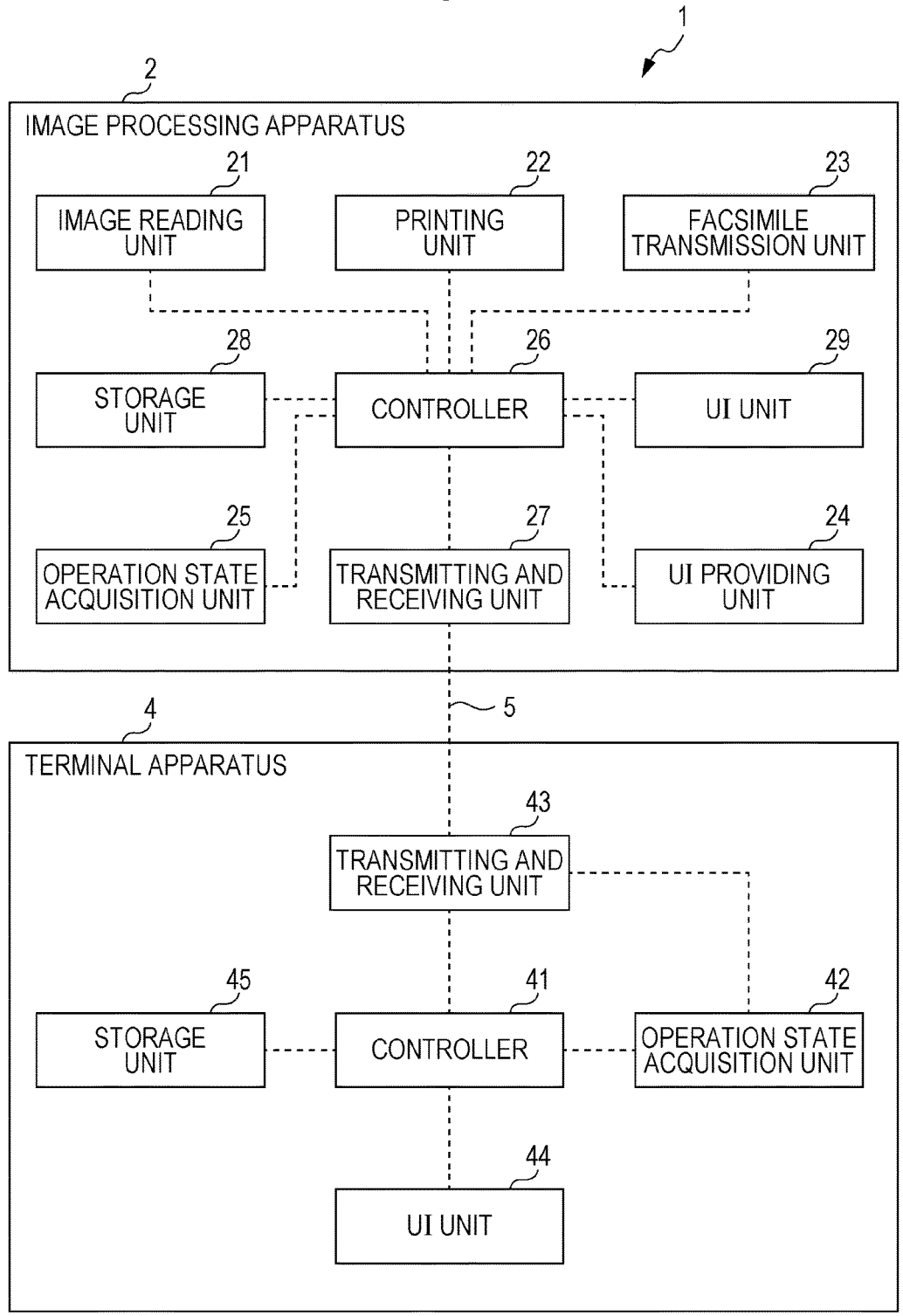

FIG. 2

| OPERATION OF IMAGE PROCESSING APPARATUS | OPERATION STATE OF IMAGE PROCESSING APPARATUS |
|---|---|
| DOCUMENT PLACED ON AUTO DOCUMENT FEEDER | CURRENTLY SCANNING |
| ADDRESS BOOK BEING OPENED | CURRENTLY SETTING DESTINATION |
| SHEET PLACED ON MANUAL PAPER TRAY | CURRENTLY PRINTING |
| BOX BEING OPENED | CURRENTLY HANDLING BOX |

FIG. 3

| LEVEL | DEFINITION OF OPERATION STATE | VALUE OF OPERATION STATE |
|---|---|---|
| A | WHAT IS CURRENTLY OPERATING APPLICATION? | · VIEWER<br>· DATA MANAGEMENT APPLICATION<br>· EMAIL SOFTWARE<br>· ADDRESS BOOK |
| B | WHAT OPERATION IS BEING PERFORMED WITH CURRENTLY OPERATING APPLICATION? | <MAP APPLICATION><br>A MAP OF THE XXX AREA IS BEING DISPLAYED.<br><br><AUTHORING APPLICATION><br>AN IMAGE IS BEING OPENED. |

FIG. 4

| APPLICATION | OPERATION STATE |
|---|---|
| VIEWER | CURRENTLY DISPLAYING FILE |
| DATA MANAGEMENT APPLICATION | CURRENTLY DISPLAYING FOLDER |
| EMAIL SOFTWARE | CURRENTLY CREATING EMAIL |
| ADDRESS BOOK | CURRENTLY DISPLAYING DESTINATION |

FIG. 5

| | | OPERATION STATE OF IMAGE PROCESSING APPARATUS | | |
|---|---|---|---|---|
| | | CURRENTLY SCANNING | CURRENTLY SETTING DESTINATION | CURRENTLY PRINTING | CURRENTLY HANDLING BOX |
| OPERATION STATE OF TERMINAL APPARATUS | CURRENTLY DISPLAYING FILE | — | <A><B> FACSIMILE TRANSMISSION from TERMINAL APPARATUS | <A><B> PRINTING from TERMINAL APPARATUS | <A><B> STORAGE OF BOX DOCUMENT from TERMINAL APPARATUS |
| | CURRENTLY DISPLAYING FOLDER | <A><B> SCANNING to TERMINAL APPARATUS | <A><B> FACSIMILE TRANSMISSION from TERMINAL APPARATUS | <A><B> PRINTING from TERMINAL APPARATUS | <A> ACQUISITION OF BOX DOCUMENT to TERMINAL APPARATUS <B> STORAGE OF BOX DOCUMENT from TERMINAL APPARATUS |
| | CURRENTLY CREATING EMAIL | <A><B> SCANNING to TERMINAL APPARATUS | <A><B> ACQUISITION OF DESTINATION to TERMINAL APPARATUS | — | <A><B> ACQUISITION OF BOX DOCUMENT to TERMINAL APPARATUS |
| | CURRENTLY DISPLAYING DESTINATION | <A><B> (1) SCANNING to EMAIL (2) SCANNING to FACSIMILE TRANSMISSION | <A> ACQUISITION OF DESTINATION to TERMINAL APPARATUS <B> REGISTRATION OF DESTINATION from TERMINAL APPARATUS | — | <A><B> (1) BOX DOCUMENT to EMAIL (2) BOX DOCUMENT to FACSIMILE TRANSMISSION |

<A>: OPERATIONS ARE PERFORMED FIRST BY IMAGE PROCESSING APPARATUS AND THEN BY TERMINAL APPARATUS
<B>: OPERATIONS ARE PERFORMED FIRST BY TERMINAL APPARATUS AND THEN BY IMAGE PROCESSING APPARATUS

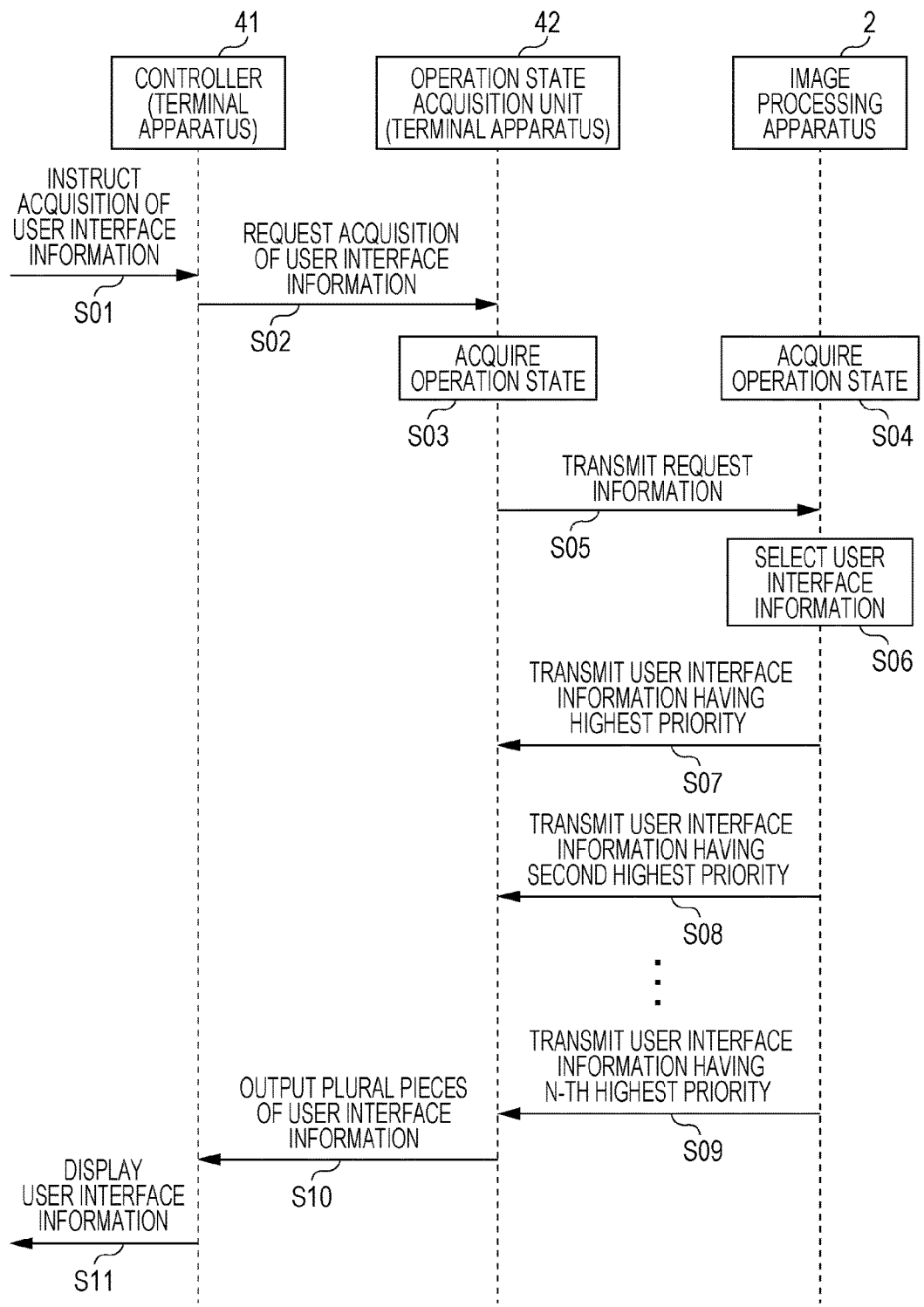

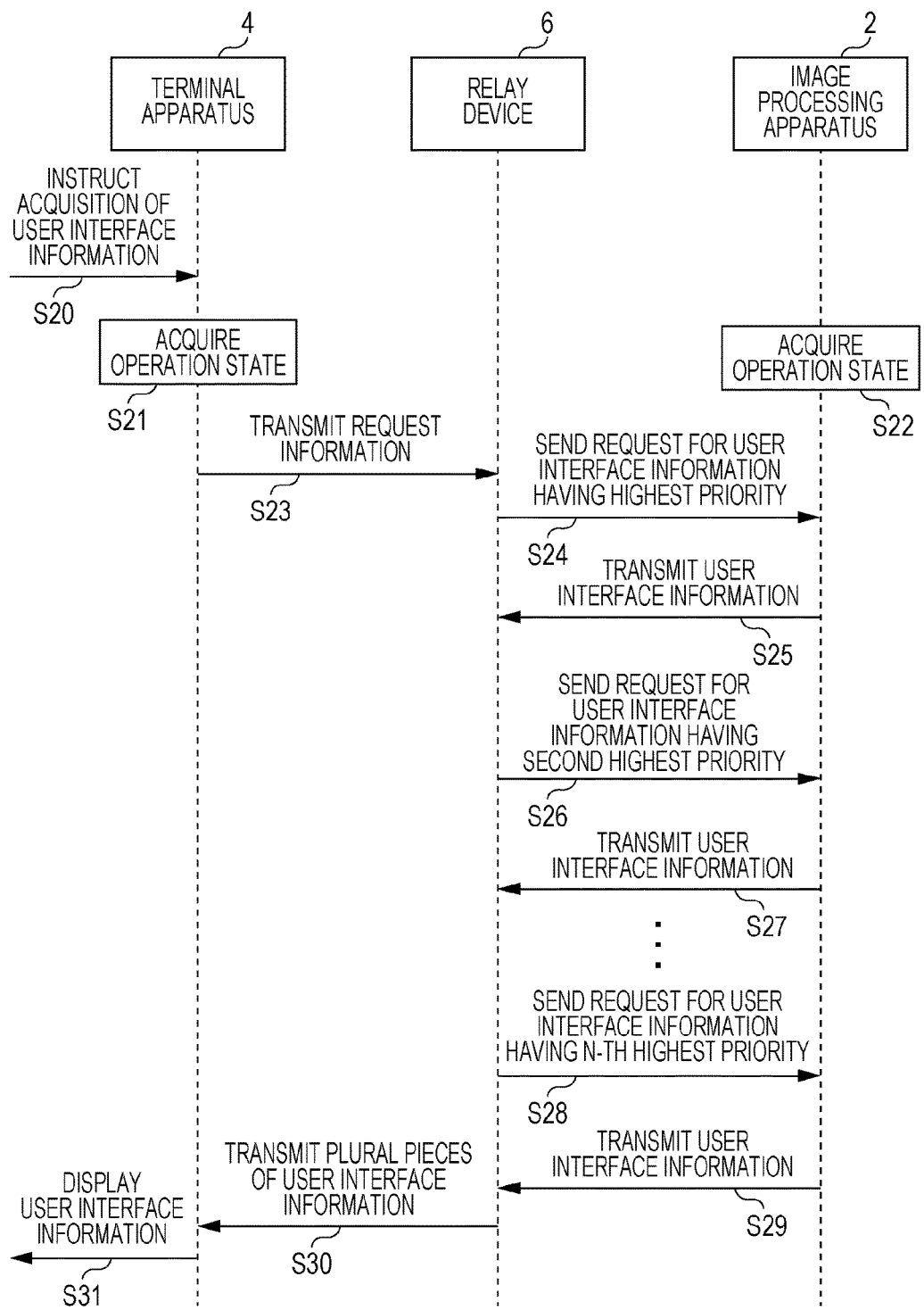

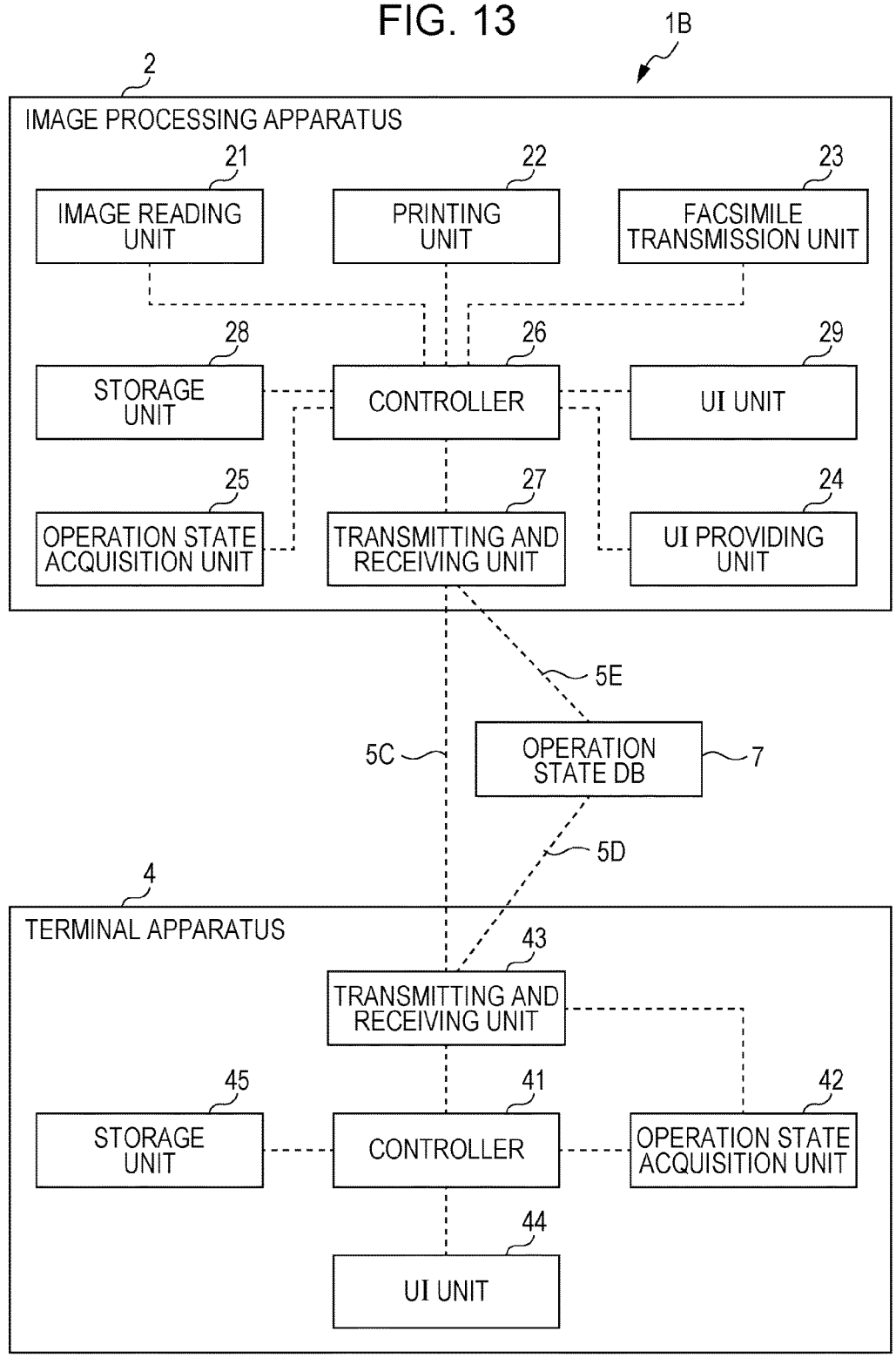

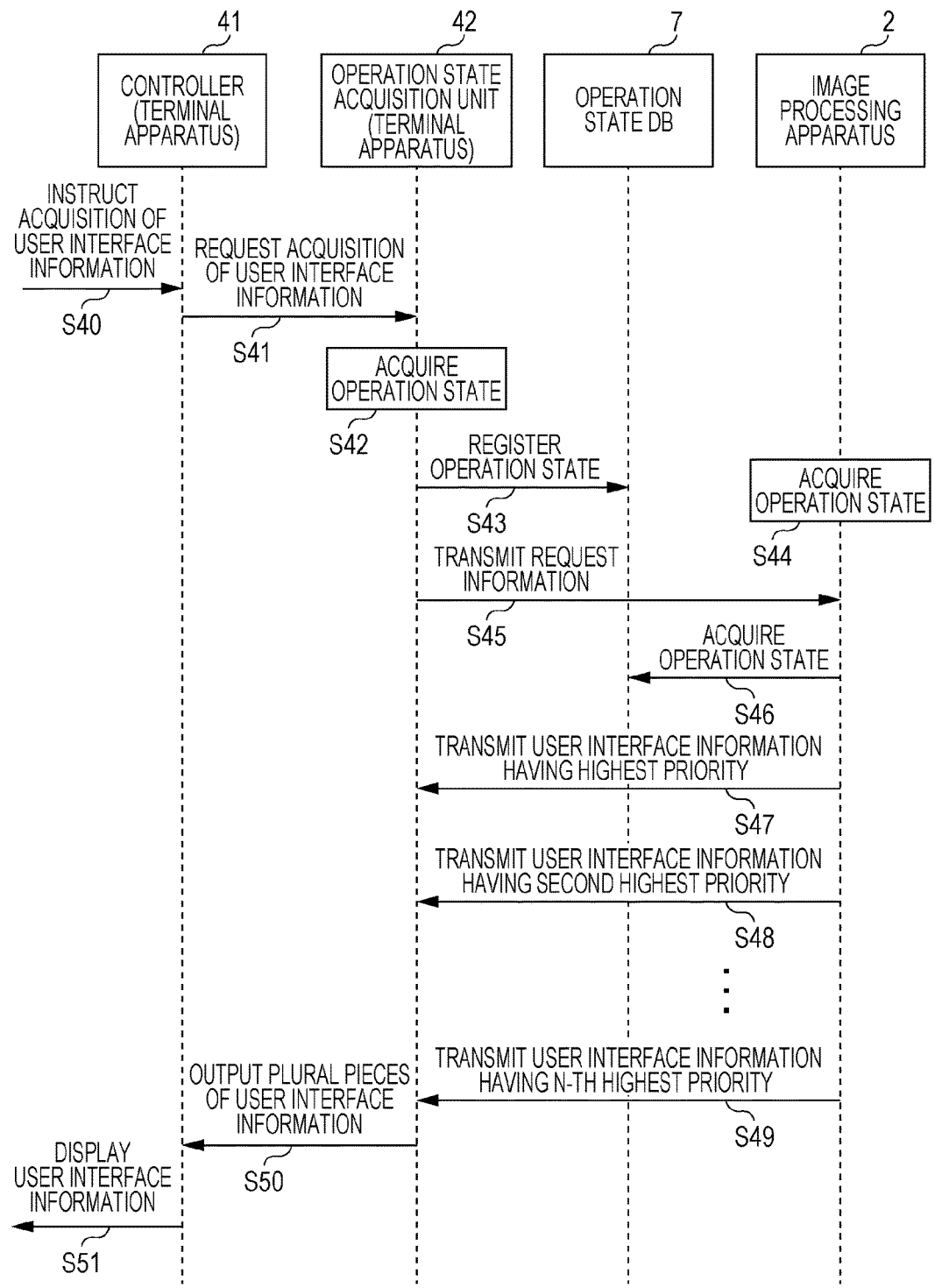

INFORMATION PROVIDING APPARATUS, INFORMATION PROVIDING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-068752 filed Mar. 26, 2012.

BACKGROUND (i) Technical Field

The present invention relates to an information providing apparatus, an information providing system, and a non-transitory computer readable medium.

(ii) Related Art

In some cases, user interface information may be provided from an information providing apparatus to terminal apparatuses such as mobile phones and personal digital assistants (PDAs) via communication paths such as networks.

SUMMARY

According to an aspect of the invention, there is provided an information providing apparatus including an image processing unit, a receiving unit, a selection unit, and a transmitting unit. The image processing unit executes image processing. The receiving unit receives first operation state information from a terminal apparatus connected to the information providing apparatus via a communication path. The first operation state information indicates an operation state of the terminal apparatus. The selection unit acquires second operation state information indicating an operation state relating to image processing being executed by the image processing unit. Upon detecting that the terminal apparatus is in a specific operation state relating to image processing in accordance with the first operation state information, the selection unit selects one or plural pieces of user interface information concerning image processing to be executable after the specific operation state is exited, in accordance with the first operation state information and the second operation state information. The transmitting unit transmits the one or plural pieces of user interface information selected by the selection unit to the terminal apparatus. When transmitting the plural pieces of user interface information to the terminal apparatus, the transmitting unit transmits the plural pieces of user interface information to the terminal apparatus in accordance with priorities which are assigned to the plural pieces of user interface information in accordance with an operation state of the terminal apparatus and an operation state of the image processing unit.

BRIEF DESCRIPTION OF THE DRAWINGS

Exemplary embodiments of the present invention will be described in detail based on the following figures, wherein:

FIG. 1 is a block diagram illustrating an image processing system according to an exemplary embodiment of the present invention;

FIG. 2 illustrates an example of operation states of the image processing apparatus;

FIG. 3 illustrates an example of definitions of the operation state of a terminal apparatus;

FIG. 4 illustrates an example of operation states of the terminal apparatus;

FIG. 5 illustrates an example of functions that are associated with operation states and operation orders;

FIG. 6 is a sequence diagram illustrating an example of the procedure of a process performed by the image processing system according to the exemplary embodiment of the present invention;

FIG. 12 is a sequence diagram illustrating an example of the procedure of a process performed by the image processing system according to the first modification;

FIG. 13 is a block diagram illustrating an image processing system according to a second modification; and FIG. 14 is a sequence diagram illustrating an example of the procedure of a process performed by the image processing system according to the second modification.

DETAILED DESCRIPTION

Figure 7:
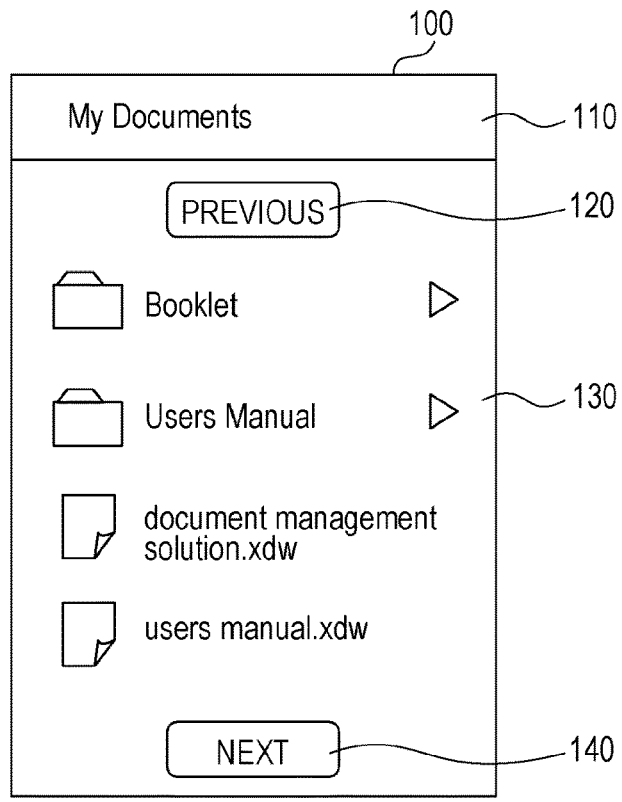
FIG. 7 illustrates an example of a user interface corresponding to an operation state.

An information providing apparatus, an information providing system, and a program according to an exemplary embodiment of the present invention will be described with reference to FIG. 1. The information providing system according to this exemplary embodiment includes an information providing apparatus which provides information, and a terminal apparatus which is provided with information. The information providing apparatus according to this exemplary embodiment provides a terminal apparatus with user interface information in accordance with the state of each of the operations being performed by the terminal apparatus and the information providing apparatus. For example, when providing a terminal apparatus with plural pieces of user interface information, the information providing apparatus according to this exemplary embodiment may provide the terminal apparatus with the plural pieces of user interface information in descending order of priority. The plural pieces of user interface information are assigned priorities in accordance with states of operations. The information providing apparatus according to this exemplary embodiment may further provide a terminal apparatus with user interface information in accordance with the state of each of the operations being performed by the terminal apparatus and the information providing apparatus and in accordance with the order of the operations. The information providing apparatus may be an apparatus that provides a terminal apparatus with user interface information via a web application or a web service, or may be an apparatus suitable for a specific application, such as an image processing apparatus. The user interface information provided by the information providing apparatus may be information to be viewed by a user on a terminal apparatus, or may be information of a user interface (UI) for setting operating conditions of an apparatus suitable for a specific application on a web browser. Hereinafter, the state of an operation may be referred to as the "operation state", and the order of operations may be referred to as the "operation order".

FIG. 1 illustrates an example of an image processing system 1 according to an exemplary embodiment of the present invention. The image processing system 1 includes an image processing apparatus 2 and a terminal apparatus 4. The image processing apparatus 2 and the terminal apparatus 4 exchange data via a communication path 5. An information providing apparatus according to an exemplary embodiment of the present invention may be implemented by the image processing apparatus 2, by way of example, and an information providing system according to an exemplary embodiment of the present invention may be implemented by the image processing apparatus 2 and the terminal apparatus 4, by way of example. The image processing apparatus 2 will be described as an example of the information providing apparatus.

Image Processing Apparatus 2

The image processing apparatus 2 may be an apparatus having at least one of image processing functions including a function for printing received data and a function for reading an image on a document and converting the read image into electronic image data. The image processing apparatus 2 may be, for example, but not be limited to, an apparatus having functions of devices such as a copier, a printer, a scanner, and a facsimile machine. The image processing apparatus according to this exemplary embodiment may also be a printer having no scanner function, a scanner having no printing function, or the like. The image processing apparatus 2 may be installed in a place, for example, an office, a convenience store or drugstore, a library, a hotel, or an apartment.

Terminal Apparatus 4

The terminal apparatus 4 may be an apparatus that can be carried, such as a mobile phone or a PDA. The terminal apparatus 4 includes a storage unit 45 that stores input or output data such as document data and image data. The document data may be, for example, data created by the terminal apparatus 4 using document creation application software, or may be data created by another apparatus and transmitted to the terminal apparatus 4 via communication or the like. The image data may be, for example, data captured using a digital camera provided in the terminal apparatus 4, if any, or data captured using another camera and transmitted to the terminal apparatus 4 via communication or the like. The image data may also be data read by the image processing apparatus 2 or another image reading device and transmitted to the terminal apparatus 4 via communication or the like. In the following description, it is assumed that the input or output data includes document data, image data, a program, and any other control data.

Communication Path 5

The communication path 5 may be a known communication medium. Examples of the communication path 5 include networks such as a local area network (LAN) and a wide area network (WAN). The image processing apparatus 2 and the terminal apparatus 4 may be connected to each other through the communication path 5 using a cable, via wireless data communication such as Wi-Fi (registered trademark), or using the G3 communication standard.

The image processing apparatus 2 and the terminal apparatus 4 may also be connected to each other via a communication path different from the communication path 5. For example, the different communication path is a communication path different from a network such as a LAN or WAN, and may be a peer to peer (P2P) communication path for directly connecting the image processing apparatus 2 to the terminal apparatus 4. For example, the different communication path may be an infrared or radio communication path. Specifically, the different communication path may be implemented by wireless data communication or data communication based on IC cards. Examples of the wireless data communication include infrared wireless data communication, known as Infrared Data Association (IrDA), and Bluetooth (registered trademark) data communication. Examples of the data communication based on IC cards include data communication using contactless IC card technologies such as Felica (registered trademark). When a communication path different from the communication path 5 is used, the image processing apparatus 2 and the terminal apparatus 4 may be connected to each other via two communication paths, that is, the communication path 5 and the different communication path.

Next, the image processing apparatus 2 will be described. As an example, the image processing apparatus 2 includes an image reading unit 21, a printing unit 22, a facsimile transmission unit 23, a user interface providing unit (or UI providing unit) 24, an operation state acquisition unit 25, a controller 26, a transmitting and receiving unit 27, a storage unit 28, and a user interface unit (or UI unit) 29.

Image Reading Unit 21, Printing Unit 22, and Facsimile Transmission Unit 23

The image reading unit 21 reads an image on a document to generate input or output data representing the image, and stores the input or output data in the storage unit 28 in accordance with control of the controller 26. The printing unit 22 receives the input or output data stored in the storage unit 28, and prints the image based on the input or output data on a sheet in accordance with control of the controller 26. The facsimile transmission unit 23 receives the input or output data stored in the storage unit 28, and transmits the image based on the input or output data via facsimile in accordance with control of the controller 26. The image processing apparatus 2 may not necessarily include all the image reading unit 21, the printing unit 22, and the facsimile transmission unit 23, and may include at least one of the image reading unit 21, the printing unit 22, and the facsimile transmission unit 23. The image processing apparatus 2 may also have a copying function for reading an image on a document by using the image reading unit 21, and printing the read image on a sheet by using the printing unit 22 to copy the image on the document onto the sheet.

UI Providing Unit 24

The UI providing unit 24 creates user interface (UI) data for performing setting about the functions (image processing) of the image processing apparatus 2 using the terminal apparatus 4. For example, the UI providing unit 24 creates user interface data for setting the operating conditions of the image reading unit 21, the printing unit 22, or the facsimile transmission unit 23 using the terminal apparatus 4. The UI providing unit 24 creates user interface data for a UI unit 44 of the terminal apparatus 4. A user interface for setting the operating conditions for the functions of the image processing apparatus 2 may be hereinafter referred to as a "setting user interface" or a "setting UI". For example, the UI providing unit 24 creates hypertext markup language (HTML) data of the setting UI in order to display the setting UI on a web browser. The UI providing unit 24 may create HTML data of a setting UI using an object-oriented programming language such as JavaScript (registered trademark). The UI providing unit 24 may also create data of a setting UI including sound and moving images or animation by creating the data of the setting UI as a Flash (registered trademark) application. The UI providing unit 24 further creates connection information for allowing the terminal apparatus 4 to access data of a setting UI via the communication path 5. The connection information may be address data by which the terminal apparatus 4 accesses data of a setting UI. The address data may be, for example, Uniform Resource Locator (URL). When the terminal apparatus 4 is connected to the image processing apparatus 2 via the communication path 5, the UI providing unit 24 provides the terminal apparatus 4 with data of a setting UI via the communication path 5. The data of the setting UI and the related address data may be stored in the storage unit 28 in advance. For example, the UI providing unit 24 has a function of a web server, and data of a setting UI, which is generated in HTML form, is stored in the URL location provided by the web server. The terminal apparatus 4 accesses the URL specified by the address data, thereby displaying the setting UI on a web browser of the terminal apparatus 4 to allow the user to set operation conditions. Further, the UI providing unit 24 may create the above user interface data for setting operating conditions on the UI unit 29 of the image processing apparatus 2, and may provide the UI unit 29 with the created user interface data.

Operation State Acquisition Unit 25

The operation state acquisition unit 25 detects an operation being performed by the image processing apparatus 2, and outputs device operation state information indicating the state of the operation to the controller 26. For example, the operation state acquisition unit 25 detects an operation the user is performing on the UI unit 29. Alternatively, the operation state acquisition unit 25 detects an operation being performed by the image reading unit 21, the printing unit 22, or the facsimile transmission unit 23. The device operation state information may be an example of second operation state information.

Controller 26

The controller 26 controls the overall operation of the image processing apparatus 2. For example, the controller 26 receives device operation state information indicating the operation state of the image processing apparatus 2 from the operation state acquisition unit 25, and receives request information indicating a request for user interface information and mobile operation state information indicating the operation state of the terminal apparatus 4 from the terminal apparatus 4 via the transmitting and receiving unit 27. The controller 26 detects the operation state of the image processing apparatus 2 in accordance with the device operation state information, and the operation state of the terminal apparatus 4 based on the mobile operation state information, selects one or more pieces of user interface information relating to the operation state of each of the image processing apparatus 2 and the terminal apparatus 4, and controls the transmitting and receiving unit 27 to provide the terminal apparatus 4 with the selected user interface information. For example, upon detecting that the terminal apparatus 4 is in a specific operation state related to image processing in accordance with the mobile operation state information, the controller 26 selects user interface information concerning one or more image processing operations expected to be executed by the image processing apparatus 2 after the operation state is exited, in accordance with the specific device operation state information and the mobile operation state information. Plural pieces of user interface information may be selected. In this case, the controller 26 selects plural pieces of user interface information, which are assigned priorities in accordance with the operation state of each of the image processing apparatus 2 and the terminal apparatus 4, and controls the transmitting and receiving unit 27 to provide the terminal apparatus 4 with the plural pieces of user interface information in accordance with the priorities.

The controller 26 may also select user interface information concerning one or more image processing operations, which relates to the operation state of each of the image processing apparatus 2 and the terminal apparatus 4 and to the operation order. The controller 26 may be an example of a selection unit, and the mobile operation state information may be an example of first operation state information. The operation state of each of the image processing apparatus 2 and the terminal apparatus 4, the operation order, and user interface information will be described hereinafter.

Operation State of Image Processing Apparatus 2

First, the operation state of the image processing apparatus 2 will be described with reference to FIG. 2. FIG. 2 illustrates an example of operation states of the image processing apparatus 2. For example, when a document is on an automatic document feeder of the image processing apparatus 2, it is expected that the document will be scanned (or an image will be read). Thus, the operation state of the image processing apparatus 2 is set to the "currently scanning" state. Upon detecting that a document has been placed on the automatic document feeder, the operation state acquisition unit 25 outputs device operation state information indicating the "currently scanning" state to the controller 26. When an address book is being displayed on the UI unit 29, it is expected that the user is setting a destination. Thus, the operation state of the image processing apparatus 2 is set to the "currently setting destination" state. Upon detecting that an address book is being displayed on the UI unit 29, the operation state acquisition unit 25 outputs device operation state information indicating the "currently setting destination" state to the controller 26. When a sheet is on a manual paper tray of the image processing apparatus 2, it is expected that printing will be performed. Thus, the operation state of the image processing apparatus 2 is set to the "currently printing" state. Upon detecting that a sheet has been placed on the manual paper tray, the operation state acquisition unit 25 outputs device operation state information indicating the "currently printing" state to the controller 26. When a function called "box operation" is being executed in the image processing apparatus 2, the operation state of the image processing apparatus 2 is set to the "currently handling box" state. The "box operation" function includes a function for saving input or output data in the storage unit 28 of the image processing apparatus 2 and a function for acquiring the input or output data from the storage unit 28. Upon detecting that the box operation is being performed, the operation state acquisition unit 25 outputs device operation state information indicating the "currently handling box" state to the controller 26.

Operation State of Terminal Apparatus 4

Next, the operation state of the terminal apparatus 4 will be described. The operation state of the terminal apparatus 4 may be defined, as an example, as the type of application software operating on the terminal apparatus 4 or as the state of an operation being performed using the application software operating on the terminal apparatus 4.

The operation state of the terminal apparatus 4 will be described with reference to FIG. 3. FIG. 3 illustrates an example of definitions of the operation state of the terminal apparatus 4. The operation state of the terminal apparatus 4 is assigned levels in accordance with accuracy. For example, in level A, the type of the application software operating on the terminal apparatus 4 corresponds to the operation state of the terminal apparatus 4. The operation state may have values "viewer", "data management application", "email software", "address book", and so forth. The value "viewer" represents, for example, application software for allowing an image to be displayed on a display device. The value "data management application" represents data management application software for managing files and folders. A file is a collection of pieces of data, and may also be referred to as a data set. A folder is a location to store files to be classified and managed in a storage device, and may also be referred to as a directory. The value "email software" represents email application software for transmitting and receiving emails. The value "address book" represents application software for managing email addresses, telephone numbers, or numbers representing facsimile transmission destinations. For example, a map in which values of the operation state are associated with application software names is created in advance, and the value of the operation state representing the application software operating on the terminal apparatus 4 may be obtained on the basis of the name of the operating application software and the map.

Further, for example, in level B, the content of the operation being performed using the application software operating on the terminal apparatus 4 corresponds to the operation state of the terminal apparatus 4. For example, when map application software for displaying a map is operating on the terminal apparatus 4 and when a map of the area XXX is being displayed on the UI unit 44 of the terminal apparatus 4, the content that "a map of the area XXX is being displayed" is set as the value of the operation state. In addition, when authoring application software for editing data such as image and audio data is operating on the terminal apparatus 4 and when an image is being displayed on the UI unit 44 of the terminal apparatus 4, the content that "an image is being opened" is set as the value of the operation state. An operation state acquisition unit 42 of the terminal apparatus 4, described below, detects the operation state of the terminal apparatus 4 in accordance with the standard of level A or the standard of level B.

FIG. 4 illustrates an example of operation states of the terminal apparatus 4. For example, when application software regarding a viewer is operating on the terminal apparatus 4 and when a file is being displayed on the UI unit 44 of the terminal apparatus 4, the "currently displaying file" state is set as the operation state. In this case, mobile operation state information indicating the "currently displaying file" state is transmitted from the terminal apparatus 4 to the image processing apparatus 2. In addition, when data management application software is operating on the terminal apparatus 4 and when a folder is being displayed on the UI unit 44 of the terminal apparatus 4, the "currently displaying folder" state is set as the operation state. In this case, mobile operation state information indicating the "currently displaying folder" state is transmitted from the terminal apparatus 4 to the image processing apparatus 2. In addition, when email application software is operating on the terminal apparatus 4 and when a user is creating an email, the "currently creating email" state is set as the operation state. In this case, mobile operation state information indicating the "currently creating email" state is transmitted from the terminal apparatus 4 to the image processing apparatus 2. In addition, when application software regarding an address book is operating on the terminal apparatus 4 and when the address of an email or a telephone number is being displayed on the UI unit 44 of the terminal apparatus 4, the "currently displaying destination" state is set as the operation state. In this case, mobile operation state information indicating the "currently displaying destination" state is transmitted from the terminal apparatus 4 to the image processing apparatus 2.

Operation Order

Next, the operation order will be described. The operation order is the order in which the image processing apparatus 2 and the terminal apparatus 4 are operated, and may be, for example, the order in which the controller 26 of the image processing apparatus 2 detects the operation states of the image processing apparatus 2 and the terminal apparatus 4. That is, the order of the operations of the image processing apparatus 2 and the terminal apparatus 4 is determined based on the order in which the controller 26 receives the device operation state information and the mobile operation state information. Here, the operation order in which the image processing apparatus 2 is operated first and then the terminal apparatus 4 is performed is defined as the "operation order A". The operation order in which the terminal apparatus 4 is operated first and then the image processing apparatus 2 is operated is defined as the "operation order B". Accordingly, upon first receiving the device operation state information and detecting the operation state of the image processing apparatus 2 and then receiving the mobile operation state information and detecting the operation state of the terminal apparatus 4, the controller 26 determines that the operation order is the "operation order A". On the other hand, upon first receiving the mobile operation state information and detecting the operation state of the terminal apparatus 4 and then receiving the device operation state information and detecting the operation state of the image processing apparatus 2, the controller 26 determines that the operation order is the "operation order B".

User Interface Information Provided from Image Processing Apparatus 2 to Terminal Apparatus 4

Next, a description will be made of user interface information to be provided from the image processing apparatus 2 to the terminal apparatus 4. The user interface information may be, for example, data of a setting UI for setting on the terminal apparatus 4 the operating conditions of the function (image processing) of the image processing apparatus 2, or address data for accessing the setting UI. More specifically, the user interface information may be data of a setting UI for setting on the terminal apparatus 4 the operating conditions of the function of the image processing apparatus 2 that is expected to be executed in association with the operation state of each of the image processing apparatus 2 and the terminal apparatus 4, or may be address data for accessing the setting UI. For example, the controller 26 of the image processing apparatus 2 selects plural functions of the image processing apparatus 2 while assigning priorities to the plural functions in accordance with the operation state of each of the image processing apparatus 2 and the terminal apparatus 4 and in accordance with the operation order, and controls the transmitting and receiving unit 27 to provide the terminal apparatus 4 with data of setting UIs for setting the operating conditions of the individual functions or with address data for accessing the respective setting UIs in descending order of priority.

Examples of the functions of the image processing apparatus 2 include an image reading function performed by the image reading unit 21, a printing function performed by the printing unit 22, a facsimile transmission function performed by the facsimile transmission unit 23, and so forth. The controller 26 controls the transmitting and receiving unit 27 to provide the terminal apparatus 4 with data of setting UIs for setting the operating conditions of the image reading unit 21, the printing unit 22, the facsimile transmission unit 23, and so forth, or with address data for accessing the setting UIs in descending order of priority.

The priority of each individual function represents, for example, how probable it is that the function will be executed after the operation being performed by each of the image processing apparatus 2 and the terminal apparatus 4 is completed. That is, a function having a relatively high probability of being executed after the operation being performed by each of the image processing apparatus 2 and the terminal apparatus 4 is completed is assigned a relatively high priority, and a function having a relatively low probability of being executed after the operation being performed by each of the image processing apparatus 2 and the terminal apparatus 4 is completed is assigned a relatively low priority. The priority of each individual function may be determined in advance on the basis of, for example, the frequency with which the function has been executed in the past. The controller 26 controls the transmitting and receiving unit 27 to provide the terminal apparatus 4 with the data or address data of setting UIs in descending order of probability of the functions being executed (i.e., in descending order of priority).

The functions of the image processing apparatus 2 that are associated with operation states and operation order will be described with reference to FIG. 5. FIG. 5 illustrates an example of functions that are associated with operation states and operation orders. For example, if the operation state of the image processing apparatus 2 is the "currently setting destination" state and the operation state of the terminal apparatus 4 is the "currently displaying file" state, it is probable that the "Facsimile transmission from Terminal apparatus" function will be executed after the above operation states are exited. Here, the "Facsimile transmission from Terminal apparatus" function is a function for executing a series of processes in which the terminal apparatus 4 transmits input or output data of a file being displayed on the terminal apparatus 4 to the image processing apparatus 2 and in which the facsimile transmission unit 23 transmits an image based on the input or output data to the destination specified by the terminal apparatus 4 via facsimile. Upon detecting that the operation state of the image processing apparatus 2 is the "currently setting destination" state in accordance with the device operation state information and detecting that the operation state of the terminal apparatus 4 is the "currently displaying file" state in accordance with the mobile operation state information, the controller 26 selects the "Facsimile transmission from Terminal apparatus" function regardless of whether the operation order is the operation order A or B, and controls the transmitting and receiving unit 27 to provide the terminal apparatus 4 with the data or address data of a setting UI for setting the operation conditions of the selected function.

If the operation state of the image processing apparatus 2 is the "currently printing" state and the operation state of the terminal apparatus 4 is the "currently displaying file" state, it is probable that the "Printing from Terminal apparatus" function will be executed after the above operation states are exited. Here, the "Printing from Terminal apparatus" function is a function for executing a series of processes in which the terminal apparatus 4 transmits input or output data of a file being displayed on the terminal apparatus 4 to the image processing apparatus 2 and in which the printing unit 22 prints an image on a sheet based on the input or output data. Upon detecting that the operation state of the image processing apparatus 2 is the "currently printing" state and the operation state of the terminal apparatus 4 is the "currently displaying file" state, the controller 26 selects the "Printing from Terminal apparatus" function regardless of whether the operation order is the operation order A or B, and controls the transmitting and receiving unit 27 to provide the terminal apparatus 4 with the data or address data of a setting UI for setting the operation conditions of the selected function.

If the operation state of the image processing apparatus 2 is the "currently handling box" state and the operation state of the terminal apparatus 4 is the "currently displaying file" state, it is probable that the "Storing box document from Terminal apparatus" function will be executed after the above operation states are exited. Here, the "Storing box document from Terminal apparatus" function is a function for executing a series of processes in which the terminal apparatus 4 transmits input or output data of a file being displayed on the terminal apparatus 4 to the image processing apparatus 2 and in which the image processing apparatus 2 saves the input or output data in the storage unit 28. Upon detecting that the operation state of the image processing apparatus 2 is the "currently handling box" state and the operation state of the terminal apparatus 4 is the "currently displaying file" state, the controller 26 selects the "Storing box document from Terminal apparatus" function regardless of whether the operation order is the operation order A or B, and controls the transmitting and receiving unit 27 to provide the terminal apparatus 4 with the data or address data of a setting UI for setting the operation conditions of the selected function.

If the operation state of the image processing apparatus 2 is the "currently scanning" state and the operation state of the terminal apparatus 4 is the "currently displaying folder" state, it is probable that the "Scanning to Terminal apparatus" function will be executed after the above operation states are exited. Here, the "Scanning to Terminal apparatus" function is a function for executing a series of processes in which the image reading unit 21 reads an image on a document to generate input or output data representing the image and in which the image processing apparatus 2 transmits the input or output data to the terminal apparatus 4. Upon detecting that the operation state of the image processing apparatus 2 is the "currently scanning" state and the operation state of the terminal apparatus 4 is the "currently displaying folder" state, the controller 26 selects the "Scanning to Terminal apparatus" function regardless of whether the operation order is the operation order A or B, and controls the transmitting and receiving unit 27 to provide the terminal apparatus 4 with the data or address data of a setting UI for setting the operation conditions of the selected function.

If the operation state of the image processing apparatus 2 is the "currently setting destination" state and the operation state of the terminal apparatus 4 is the "currently displaying folder" state, it is probable that the "Facsimile transmission from Terminal apparatus" function will be executed after the above operation states are exited. Upon detecting that the operation state of the image processing apparatus 2 is the "currently setting destination" state and the operation state of the terminal apparatus 4 is the "currently displaying folder" state, the controller 26 selects the "Facsimile transmission from Terminal apparatus" function regardless of whether the operation order is the operation order A or B, and controls the transmitting and receiving unit 27 to provide the terminal apparatus 4 with the data or address data of a setting UI for setting the operation conditions of the selected function.

If the operation state of the image processing apparatus 2 is the "currently printing" state and the operation state of the terminal apparatus 4 is the "currently displaying folder" state, it is probable that the "Printing from Terminal apparatus" function will be executed after the above operation states are exited. Upon detecting that the operation state of the image processing apparatus 2 is the "currently printing" state and the operation state of the terminal apparatus 4 is the "currently displaying folder" state, the controller 26 selects the "Printing from Terminal apparatus" function regardless of whether the operation order is the operation order A or B, and controls the transmitting and receiving unit 27 to provide the terminal apparatus 4 with the data or address data of a setting UI for setting the operation conditions of the selected function.

If the operation state of the image processing apparatus 2 is the "currently handling box" state and the operation state of the terminal apparatus 4 is the "currently displaying folder" state, it is probable that the "Acquisition of box document to Terminal apparatus" function or the "Storage of box document from Terminal apparatus" function will be executed in accordance with the order of the operations of the image processing apparatus 2 and the terminal apparatus 4. Here, the "Acquisition of box document to Terminal apparatus" function is a function for executing a series of processes in which the image processing apparatus 2 transmits input or output data to the terminal apparatus 4 and in which the terminal apparatus 4 acquires the input or output data. Upon detecting that the operation state of the image processing apparatus 2 is the "currently handling box" state, detecting that the operation state of the terminal apparatus 4 is the "currently displaying folder" state, and detecting the operation state of the image processing apparatus 2 earlier than the operation state of the terminal apparatus 4 (in the case of the operation order A), the controller 26 selects the "Acquisition of box document to Terminal apparatus" function, and controls the transmitting and receiving unit 27 to provide the terminal apparatus 4 with the data or address data of a setting UI for setting the operation conditions of the selected function. In contrast, upon detecting that the operation state the image processing apparatus 2 is "currently handling box", detecting that the operation state of the terminal apparatus 4 is "currently displaying folder", and detecting the operation state of the terminal apparatus 4 earlier than the operation state of the image processing apparatus 2 (in the case of the operation order B), the controller 26 selects the "Storage of box document from Terminal apparatus" function, and controls the transmitting and receiving unit 27 to provide the terminal apparatus 4 with the data or address data of a setting UI for setting the operation conditions of the selected function.

If the operation state of the image processing apparatus 2 is the "currently scanning" state and the operation state of the terminal apparatus 4 is the "currently creating email" state, it is probable that the "Scanning to Terminal apparatus" function will be executed after the above operation states are exited. Upon detecting that the operation state of the image processing apparatus 2 is the "currently scanning" state and detecting that the operation state of the terminal apparatus 4 is the "currently creating email" state, the controller 26 selects the "Scanning to Terminal apparatus" function regardless of whether the operation order is the operation order A or B, and controls the transmitting and receiving unit 27 to provide the terminal apparatus 4 with the data or address data of a setting UI for setting the operation conditions of the selected function.

If the operation state of the image processing apparatus 2 is the "currently setting destination" state and the operation state of the terminal apparatus 4 is the "currently creating email" state, it is probable that the "Acquisition of destination to Terminal apparatus" function will be executed after the above operation states. Here, the "Acquisition of destination to Terminal apparatus" function is a function for executing a series of processes in which the image processing apparatus 2 transmits destination data indicating a destination registered in the image processing apparatus 2 to the terminal apparatus 4 and in which the terminal apparatus 4 acquires the destination data. Upon detecting that the operation state of the image processing apparatus 2 is the "currently setting destination" state and detecting that the operation state of the terminal apparatus 4 is the "currently creating email" state, the controller 26 selects the "Acquisition of destination to Terminal apparatus" function regardless of whether the operation order is the operation order A or B, and controls the transmitting and receiving unit 27 to provide the terminal apparatus 4 with the data or address data of a setting UI for setting the operation conditions of the selected function.

If the operation state of the image processing apparatus 2 is the "currently handling box" state and the operation state of the terminal apparatus 4 is the "currently creating email" state, it is probable that the "Acquisition of box document to Terminal apparatus" function will be executed after the above operation states are exited. Upon detecting that the operation state of the image processing apparatus 2 is the "currently handling box" state and detecting that the operation state of the terminal apparatus 4 is the "currently creating email" state, the controller 26 selects the "Acquisition of box document to Terminal apparatus" function regardless of whether the operation order is the operation order A or B, and controls the transmitting and receiving unit 27 to provide the terminal apparatus 4 with the data or address data of a setting UI for setting the operation conditions of the selected function.

If the operation state of the image processing apparatus 2 is the "currently scanning" state and the operation state of the terminal apparatus 4 is the "currently displaying destination" state, it is the most probable that the "Scanning to Email" function will be executed after the above operation states are exited, and it is the second most probable that the "Scanning to Facsimile transmission" function will be executed after the above operation states are exited. Here, the "Scanning to Email" function is a function for executing a series of processes in which the image reading unit 21 reads an image on a document to generate input or output data representing the image and in which the image processing apparatus 2 transmits the input or output data to the address specified by the terminal apparatus 4 via email. In addition, the "Scanning to Facsimile transmission" function is a function for executing a series of processes in which the image reading unit 21 reads an image on a document to generate input or output data representing the image and in which the facsimile transmission unit 23 transmits the image based on the input or output data to the destination specified by the terminal apparatus 4 via facsimile. Upon detecting that the operation state of the image processing apparatus 2 is the "currently scanning" state and detecting that the operation state of the terminal apparatus 4 is the "currently displaying destination" state, the controller 26 selects the "Scanning to Email" function as the highest priority function regardless of whether the operation order is the operation order A or B, and selects the "Scanning to Facsimile transmission" function as the second highest priority function. Then, the controller 26 controls the transmitting and receiving unit 27 to provide the terminal apparatus 4 in the first place with the data or address data of a setting UI for setting the operation conditions of the highest priority "Scanning to Email" function. The controller 26 further controls the transmitting and receiving unit 27 to provide the terminal apparatus 4 in the second place with the data or address data of a setting UI for setting the operation conditions of the second highest priority "Scanning to Facsimile transmission" function.

If the operation state of the image processing apparatus 2 is the "currently setting destination" state and the operation state of the terminal apparatus 4 is the "currently displaying destination" state, it is probable that the "Acquisition of destination to Terminal apparatus" function or the "Registration of destination from Terminal apparatus" function will be executed in accordance with the order of the operations of the image processing apparatus 2 and the terminal apparatus 4. Here, the "Registration of destination from Terminal apparatus" function is a function for executing a series of processes in which the terminal apparatus 4 transmits destination data indicating a destination being displayed on the terminal apparatus 4 to the image processing apparatus 2 and in which the image processing apparatus 2 acquires the destination data and registers the destination. Upon detecting that the operation state of the image processing apparatus 2 is the "currently setting destination" state, detecting that the operation state of the terminal apparatus 4 is the "currently displaying destination" state, and detecting the operation state of the image processing apparatus 2 earlier than the operation state of the terminal apparatus 4 (in the case of the operation order A), the controller 26 selects the "Acquisition of destination to Terminal apparatus" function, and controls the transmitting and receiving unit 27 to provide the terminal apparatus 4 with the data or address data of a setting UI for setting the operation conditions of the selected function. In contrast, upon detecting that the operation state of the image processing apparatus 2 is the "currently setting destination" state, detecting that the operation state of the terminal apparatus 4 is the "currently displaying destination" state, and detecting the operation state of the terminal apparatus 4 earlier than the operation state of the image processing apparatus 2 (in the case of the operation order B), the controller 26 selects the "Registration of destination from Terminal apparatus" function, and controls the transmitting and receiving unit 27 to provide the terminal apparatus 4 with the data or address data of a setting UI for setting the operation conditions of the selected function.

If the operation state of the image processing apparatus 2 is the "currently handling box" state and the operation state of the terminal apparatus 4 is the "currently displaying destination" state, it is the most probable that the "Box document to Email" function will be executed after the above operation states are exited, and it is the second most probable that the "Box document to Facsimile transmission" function will be executed after the above operation states are exited. Here, the "Box document to Email" function is a function for executing a series of processes in which the image processing apparatus 2 transmits input or output data stored in the storage unit 28 to the address specified by the terminal apparatus 4 via email. In addition, the "Box document to Facsimile transmission" function is a function for executing a series of processes in which the facsimile transmission unit 23 transmits an image based on input or output data stored in the storage unit 28 to the destination specified by the terminal apparatus 4 via facsimile. Upon detecting that the operation state of the image processing apparatus 2 is the "currently handling box" state and detecting that the operation state of the terminal apparatus 4 is the "currently displaying destination" state, the controller 26 selects the "Box document to Email" function as the highest priority function and the "Box document to Facsimile transmission" function as the second highest priority function regardless of whether the operation order is the operation order A or B. Then, the controller 26 controls the transmitting and receiving unit 27 to provide the terminal apparatus 4 in the first place with the data or address data of a setting UI for setting the operation conditions of the highest priority "Box document to Email" function. The controller 26 further controls the transmitting and receiving unit 27 to provide the terminal apparatus 4 in the second place with the data or address data of a setting UI for setting the operation conditions of the second highest priority "Box document to Facsimile transmission" function.

The controller 26 may also control the transmitting and receiving unit 27 to provide the terminal apparatus 4 with the data or address data of a setting UI for "displaying a list of functions" as the lowest priority user interface information. The setting UI for "displaying a list of functions" is a screen for presenting a list of functions of the image processing apparatus 2 to allow a user to select one of the functions of the image processing apparatus 2 using the terminal apparatus 4. For example, the setting UI for "displaying a list of functions" provides a list of functions including "Scanning to Terminal apparatus", "Printing from Terminal apparatus", "Facsimile transmission from Terminal apparatus", and so forth.

For example, a table in which the operation states of the image processing apparatus 2 and the terminal apparatus 4, the operation order, and the respective functions are associated with one another is created in advance, and is stored in the storage unit 28. As an example, the table representing the correspondence relationships illustrated in FIG. 5 is created in advance and is stored in the storage unit 28 in advance. The controller 26 refers to the table stored in the storage unit 28 to select a function associated with the operation state of each of the image processing apparatus 2 and the terminal apparatus 4 and the operation order, and controls the transmitting and receiving unit 27 to provide the terminal apparatus 4 with the data or address data of a setting UI for setting the operation conditions of the selected function in descending order of priority.

The controller 26 may control the transmitting and receiving unit 27 to provide the terminal apparatus 4 with only the highest priority user interface information. The controller 26 may also control the transmitting and receiving unit 27 to provide the terminal apparatus 4 collectively with plural pieces of data of setting UIs or plural pieces of related address data while assigning priority information to the plural pieces of data or address data. In this case, the terminal apparatus 4 interprets the priority information assigned to the individual pieces of data or address data of the setting UIs, and displays the setting UIs in accordance with the priorities.

If only request information indicating a request for user interface information has been transmitted from the terminal apparatus 4 to the image processing apparatus 2 without operating the terminal apparatus 4, the controller 26 detects that the operation state of the terminal apparatus 4 is the "no operation state". In this case, there is no setting UI corresponding to the operation state. Thus, the controller 26 controls the transmitting and receiving unit 27 to provide the terminal apparatus 4 with data of a predetermined default user interface. Similarly, if request information and mobile operation state information have been transmitted from the terminal apparatus 4 to the image processing apparatus 2 without operating the image processing apparatus 2, the controller 26 detects that the operation state of the image processing apparatus 2 is "no operation state". Also in this case, the controller 26 controls the transmitting and receiving unit 27 to provide the terminal apparatus 4 with data of a predetermined default user interface. The terminal apparatus 4 displays the default user interface on the UI unit 44 of the terminal apparatus 4. The terminal apparatus 4 may minimize the default user interface and may display the minimized default user interface on the UI unit 44.

The controller 26 receives control data (command data) transmitted from the terminal apparatus 4, and controls the operation of the image reading unit 21, the printing unit 22, the facsimile transmission unit 23, or the like in accordance with the control data. The control data may be data indicating a command concerning image processing to be performed by the image processing apparatus 2, and may be, as an example, data indicating the operating conditions of an operation such as reading an image, printing, facsimile transmission, email transmission, acquiring a destination, registering a destination, or box operation. As an example, in a case where an image is to be read by the image reading unit 21, information concerning image reading conditions, such as resolution, density, monochrome/color selection, the document size, and the file name of read image data, is included in the control data. In a case where printing is to be performed by the printing unit 22, information concerning printing conditions, such as resolution, density, monochrome/color selection, paper size, the number of copies to be printed, and the file name of data to be printed, is included in the control data. In a case where facsimile transmission is to be performed by the facsimile transmission unit 23, information concerning facsimile transmission conditions, such as resolution, density, the telephone number of the transmission destination, and the file name of data to be transmitted, is included in the control data. For example, the controller 26 receives a hypertext transfer protocol (HTTP) request transmitted from the terminal apparatus 4, analyzes the content of the request, and controls the operation of the image reading unit 21, the printing unit 22, the facsimile transmission unit 23, or the like.

Transmitting and Receiving Unit 27

The transmitting and receiving unit 27 of the image processing apparatus 2 receives request information indicating a request for user interface information and mobile operation state information indicating the operation state of the terminal apparatus 4 from the terminal apparatus 4 via the communication path 5, and outputs the request information and the mobile operation state information to the controller 26. Further, the transmitting and receiving unit 27 transmits data of a setting UI to the terminal apparatus 4 via the communication path 5. For example, the transmitting and receiving unit 27 transmits plural pieces of data of setting UIs to the terminal apparatus 4 in descending order of priority, in accordance with control of the controller 26.

Alternatively, the transmitting and receiving unit 27 transmits address data for allowing the terminal apparatus 4 to access data of a setting UI via the communication path 5 to the terminal apparatus 4 via the communication path 5. For example, the transmitting and receiving unit 27 transmits plural pieces of address data of setting UIs to the terminal apparatus 4 in descending order of priority, in accordance with control of the controller 26. As an example, if the image processing apparatus 2 is connected to a LAN, the transmitting and receiving unit 27 transmits address data of a setting UI in the LAN to the terminal apparatus 4 via the communication path 5. If the image processing apparatus 2 is connected to a WAN, the transmitting and receiving unit 27 transmits address data of a setting UI in the WAN to the terminal apparatus 4 via the communication path 5. When the terminal apparatus 4 accesses data of a setting UI via the communication path 5 using related address data, the transmitting and receiving unit 27 transmits the data of the setting UI to the terminal apparatus 4 via the communication path 5.

If the image reading unit 21 reads an image and generates input or output data in accordance with an instruction from the terminal apparatus 4, the transmitting and receiving unit 27 transmits the input or output data to the terminal apparatus 4 via the communication path 5. Further, the transmitting and receiving unit 27 receives data to be printed by the printing unit 22 or data to be transmitted from the facsimile transmission unit 23 and control data (command data) to the terminal apparatus 4 via the communication path 5. Specifically, the transmitting and receiving unit 27 receives control data from the terminal apparatus 4 via the communication path 5 as an HTTP request. In a case where printing or facsimile transmission is to be performed by the image processing apparatus 2, the transmitting and receiving unit 27 receives input or output data to be printed or transmitted, via facsimile from the terminal apparatus 4 via the communication path 5. In a case where an image is to be read by the image processing apparatus 2, the transmitting and receiving unit 27 transmits input or output data generated by the image reading unit 21 to the terminal apparatus 4 via the communication path 5 as an HTTP response to the HTTP request.

The image processing apparatus 2 and the terminal apparatus 4 may be connected to each other via two communication paths, that is, the communication path 5 and the different communication path described above. For example, the transmitting and receiving unit 27 may receive request information and mobile operation state information from the terminal apparatus 4 via the different communication path, and may transmit address data of a setting UI to the terminal apparatus 4 via the different communication path. For example, if the different communication path is a communication path based on wireless data communication such as IrDA or Bluetooth (registered trademark) data communication, the transmitting and receiving unit 27 transmits and receives infrared light or radio waves to and from the transmitting and receiving unit 43 of the terminal apparatus 4 to communicate with the transmitting and receiving unit 43, and receives request information and mobile operation state information from the transmitting and receiving unit 43 via the different communication path. Further, the transmitting and receiving unit 27 transmits plural pieces of address data of setting UIs to the transmitting and receiving unit 43 via the different communication path in descending order of priority. When the transmitting and receiving unit 43 of the terminal apparatus 4 accesses data of a setting UI via the communication path 5 using address data transmitted from the image processing apparatus 2, the transmitting and receiving unit 27 transmits the data of the setting UI to the terminal apparatus 4 via the communication path 5. In this way, the terminal apparatus 4 may transmit request information and mobile operation state information to the image processing apparatus 2 via a communication path different from the communication path 5, and the image processing apparatus 2 may transmit plural pieces of address data of setting UIs to the terminal apparatus 4 via the different communication path in descending order of priority, and transmit data of the setting UIs to the terminal apparatus 4 via the communication path 5.

Storage Unit 28

The storage unit 28 of the image processing apparatus 2 stores correspondence relationship information indicating correspondence relationships between the operation states of the image processing apparatus 2 and the terminal apparatus 4, the operation order, and plural pieces of user interface information assigned priorities. As an example, the storage unit 28 stores the table illustrated in FIG. 5. The storage unit 28 also stores input or output data generated by the image reading unit 21, data to be printed, which has been transmitted from the terminal apparatus 4, data to be transmitted via facsimile, control data (command data), and so forth.

UI Unit 29

The UI unit 29 of the image processing apparatus 2 has a display, and displays, for example, a user interface provided from the UI providing unit 24. The UI unit 29 receives control data regarding the operating conditions of an operation such as reading an image, printing, facsimile transmission, email transmission, acquiring a destination, registering a destination, or box operation, which has been input by a user.

Next, the terminal apparatus 4 will be described. As an example, the terminal apparatus 4 includes a controller 41, the operation state acquisition unit 42, the transmitting and receiving unit 43, the user interface unit (or UI unit) 44, and the storage unit 45.

Controller 41

The controller 41 of the terminal apparatus 4 executes application software specified by a user. For example, the controller 41 executes application software such as application software relating to a viewer, data management application software, email application software, application software relating to an address book, map application software, or authoring application software. The application software described above may be stored in, for example, the storage unit 45 in advance, or may be transmitted from an external device to the terminal apparatus 4 via communication or the like. Further, upon receiving from a user an instruction to acquire user interface information relating to an operation being performed by the terminal apparatus 4, the controller 41 requests the operation state acquisition unit 42 to acquire the operation state of the terminal apparatus 4.

Operation State Acquisition Unit 42

The operation state acquisition unit 42 detects the state of the operation being performed by the terminal apparatus 4. For example, the operation state acquisition unit 42 detects the type of the application software operating on the controller 41 or detects the operation being performed using the operating application software.

For example, if the operation state is defined on the basis of the level A illustrated in FIG. 3, a map in which the values of the operation state illustrated in FIG. 3 and the names of application software are associated with each other is created in advance, and is stored in the storage unit 45 in advance. The operation state acquisition unit 42 acquires the name of the application software operating on the terminal apparatus 4 from the controller 41, and refers to the map described above to acquire the value of the operation state corresponding to the operating application software. For example, if application software relating to a viewer is being executed by the controller 41, the operation state acquisition unit 42 acquires the name of the application software relating to the viewer from the controller 41, and refers to the map described above to acquire the value ("viewer") of the operation state. If data management application software for managing files and folders is being executed by the controller 41, the operation state acquisition unit 42 acquires the name of the data management application software from the controller 41, and refers to the map described above to acquire the value ("data management application") of the operation state.

If the operation state is defined on the basis of the level B illustrated in FIG. 3, the controller 41 outputs to the operation state acquisition unit 42 mobile operation state information indicating the operation being performed using the application software operating on the terminal apparatus 4, and the operation state acquisition unit 42 acquires the operation state. For example, if map application software has been executed by the controller 41 and a map of the area XXX is being displayed on the UI unit 44, the controller 41 outputs mobile operation state information indicating that "a map of the area XXX is being displayed" to the operation state acquisition unit 42. If authoring application software has been executed by the controller 41 and an image is being displayed on the UI unit 44, the controller 41 outputs mobile operation state information indicating that "an image is being displayed" to the operation state acquisition unit 42. As an example, the operation state acquisition unit 42 may detect the operation state of the terminal apparatus 4 in accordance with the standard of the level A or the standard of the level B.

The operation state acquisition unit 42 outputs request information indicating a request for user interface information and mobile operation state information indicating the operation state to the transmitting and receiving unit 43. The operation state acquisition unit 42 may add the mobile operation state information to the request information, and output the request information with the mobile operation state information to the transmitting and receiving unit 43.

Transmitting and Receiving Unit 43

The transmitting and receiving unit 43 of the terminal apparatus 4 transmits request information indicating a request for user interface information and mobile operation state information indicating the operation state of the terminal apparatus 4 to the image processing apparatus 2 via the communication path 5.

Further, the transmitting and receiving unit 43 receives address data of a setting UI from the image processing apparatus 2 via the communication path 5. If plural pieces of address data of setting UIs have been transmitted from the image processing apparatus 2 in descending order of priority, the transmitting and receiving unit 43 sequentially receives the plural pieces of address data. The plural pieces of address data received by the transmitting and receiving unit 43 are stored in the storage unit 45 of the terminal apparatus 4. In addition, as described above, if the image processing apparatus 2 and the terminal apparatus 4 are connected to each other via two communication paths, that is, the communication path 5 and the different communication path described above, the transmitting and receiving unit 43 may transmit the request information and the mobile operation state information to the image processing apparatus 2 via the different communication path, and receive address data of a setting UI from the image processing apparatus 2 via the different communication path.

The transmitting and receiving unit 43 further receives data of the setting UI from the image processing apparatus 2 via the communication path 5. For example, a program of the web browser is stored in the storage unit 45 in advance. When a user gives an instruction to activate the web browser by using the UI unit 44, the controller 41 activates the web browser in accordance with the instruction given from the user. Then, the transmitting and receiving unit 43 accesses the data of the setting UI via the communication path 5 using the address data specified by the user. After that, the data of the setting UI is provided from the UI providing unit 24 of the image processing apparatus 2 to the UI unit 44 of the terminal apparatus 4 through the transmitting and receiving unit 27 of the image processing apparatus 2, the communication path 5, and the transmitting and receiving unit 43 of the terminal apparatus 4. The web browser of the terminal apparatus 4 displays the setting UI received from the image processing apparatus 2. Further, if the transmitting and receiving unit 43 has received address data from the image processing apparatus 2, the controller 41 may automatically activate the web browser without waiting for an instruction to be given from a user, and the transmitting and receiving unit 43 may access the data of the setting UI via the communication path 5 by using the address data. For example, the transmitting and receiving unit 43 may access the data of the setting UI via the communication path 5 using the highest priority address data without waiting for an instruction from the user.

Further, the transmitting and receiving unit 43 transmits data to be printed by the printing unit 22 of the image processing apparatus 2, data to be transmitted by the facsimile transmission unit 23 of the image processing apparatus 2, control data (command data), and so forth to the image processing apparatus 2 via the communication path 5. If the image reading unit 21 has read an image and generated input or output data in accordance with an instruction from the terminal apparatus 4, the transmitting and receiving unit 43 receives the input or output data from the image processing apparatus 2 via the communication path 5. For example, a user inputs, through the setting UI displayed on the UI unit 44, control data (command data) regarding the operation conditions of an operation such as reading an image, printing, facsimile transmission, email transmission, acquiring a destination, registering a destination, or box operation. The transmitting and receiving unit 43 transmits the control data to the image processing apparatus 2 via the communication path 5 as an HTTP request. If printing or facsimile transmission is to be performed by the image processing apparatus 2, the transmitting and receiving unit 43 transmits the data to be printed or transmitted via facsimile to the image processing apparatus 2 via the communication path 5. The data to be printed or transmitted via facsimile is specified by a user using the UI unit 44. If an image is to be read by the image processing apparatus 2, the transmitting and receiving unit 43 receives input or output data generated by the image reading unit 21 from the image processing apparatus 2 via the communication path 5 as an HTTP response to the HTTP request.

UI Unit 44

The UI unit 44 of the terminal apparatus 4 has a display, and displays plural pieces of user interface information. For example, the UI unit 44 displays plural pieces of address data of setting UIs transmitted from the image processing apparatus 2. The UI unit 44 may display the plural pieces of address data in list form, or may display the plural pieces of address data in descending order of priority in accordance with the operation state. For example, the UI unit 44 may display the plural pieces of address data as thumbnail images (small images), or may display the plural pieces of address data in descending order of priority in accordance with an instruction from the user. The UI unit 44 further displays a setting UI.

Further, the UI unit 44 receives an instruction from the user to acquire user interface information and receives address data specified by a user. For example, a user specifies, using the UI unit 44, address data of a setting UI for setting the operating condition of the function (image processing) that the user wishes to execute among plural pieces of address data being displayed on the UI unit 44. The UI unit 44 further receives the control data regarding the operating conditions of an operation such as reading an image, printing, facsimile transmission, email transmission, acquiring a destination, registering a destination, or box operation, which has been input by a user.

Storage Unit 45

The storage unit 45 stores input or output data. For example, the storage unit 45 stores input or output data generated by the image reading unit 21 of the image processing apparatus 2, and input or output data to be printed or transmitted via facsimile by the image processing apparatus 2. The storage unit 45 also stores application software to be executed by the controller 41. The storage unit 45 further stores plural pieces of address data of setting UIs transmitted from the image processing apparatus 2.

Next, the operation of the image processing system 1 will be described with reference to FIG. 6. FIG. 6 is a sequence diagram illustrating an example of the procedure of a process performed by the image processing system 1.

First, a user gives an instruction using the UI unit 44 of the terminal apparatus 4 to activate specific application software. Then, the controller 41 of the terminal apparatus 4 activates the application software specified by the user. The user uses the activated application software to create a document, display a file such as an image file or a document file on the UI unit 44, or display a folder on the UI unit 44.

FIG. 7 illustrates an example of the file to be displayed on the UI unit 44 of the terminal apparatus 4. For example, the controller 41 activates data management application software, and a user specifies a folder or a file using the UI unit 44. A user interface 100 displayed on the UI unit 44 includes, as an example, a display area 110 where the name of a folder is displayed, scroll operation portions 120 and 140 used to display another folder, and a display area 130 where data in the folder or a sub-folder in the folder is displayed.

Figure 8:
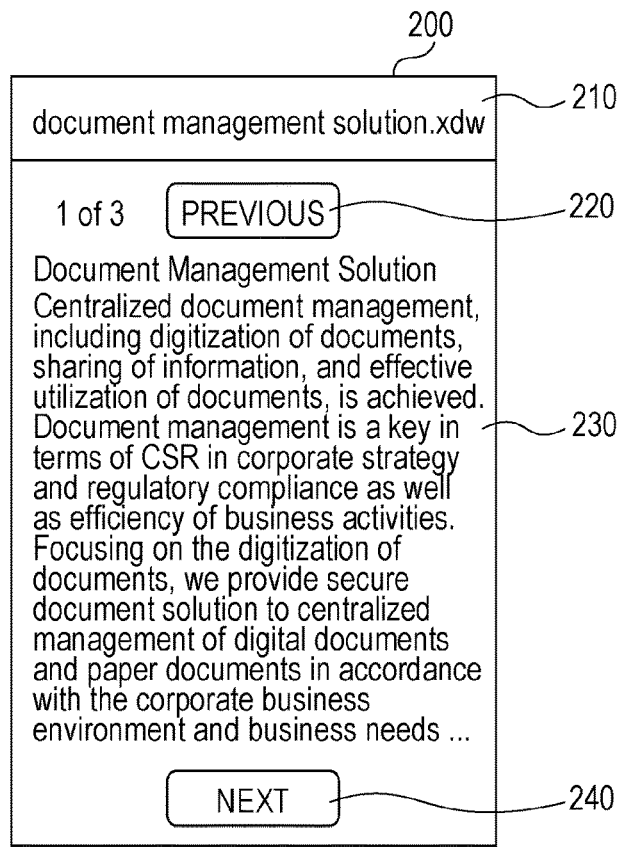
FIG. 8 illustrates an example of a user interface corresponding to an operation state.

FIG. 8 illustrates an example of a file to be displayed on the UI unit 44 of the terminal apparatus 4. For example, the controller 41 activates document creation application software, and a user creates and edits a document using the UI unit 44. A user interface 200 displayed on the UI unit 44 includes, as an example, a display area 210 where the name of a document is displayed, scroll operation portions 220 and 240 used to scroll the document to change over pages, and a display area 230 where the content of the document is displayed.

When a user gives an instruction using the UI unit 44 of the terminal apparatus 4 to acquire user interface information relating to an operation (S01), information indicating the instruction is output from the UI unit 44 to the controller 41. The controller 41 requests the operation state acquisition unit 42 to acquire the operation state (S02).

The operation state acquisition unit 42 detects the state of the operation being performed by the terminal apparatus 4 (step S03). For example, as illustrated in FIG. 8, if a folder is being displayed on the UI unit 44, the controller 41 outputs mobile operation state information indicating the "currently displaying folder" state to the operation state acquisition unit 42, and the operation state acquisition unit 42 detects the operation state of the terminal apparatus 4. As illustrated in FIG. 8, if a file is being displayed on the UI unit 44, the controller 41 outputs mobile operation state information indicating the "currently displaying file" state to the operation state acquisition unit 42, and the operation state acquisition unit 42 acquires the operation state of the terminal apparatus 4. The operation state acquisition unit 42 outputs the request information and the device operation state information to the transmitting and receiving unit 43.

When the user performs an operation on the image processing apparatus 2, the operation state acquisition unit 25 of the image processing apparatus 2 detects the state of the operation being performed on the image processing apparatus 2 (S04). For example, upon detecting that a document has been placed on the automatic document feeder, the operation state acquisition unit 25 outputs device operation state information indicating the "currently scanning" state to the controller 26. Upon detecting that an address book is being displayed on the UI unit 29, the operation state acquisition unit 25 outputs device operation state information indicating the "currently setting destination" state to the controller 26. Upon detecting that a sheet has been placed on the manual paper tray, the operation state acquisition unit 25 outputs device operation state information indicating the "currently printing" state to the controller 26. Upon detecting that the box operation is being performed, the operation state acquisition unit 25 outputs device operation state information indicating the "currently handling box" state to the controller 26.

Then, the transmitting and receiving unit 43 of the terminal apparatus 4 transmits the request information and the mobile operation state information to the image processing apparatus 2 via the communication path 5 in accordance with a transmission request given from the user (S05). Alternatively, the transmitting and receiving unit 43 may transmit the request information and the mobile operation state information to the image processing apparatus 2 via a communication path different from the communication path 5. The transmitting and receiving unit 27 of the image processing apparatus 2 receives the request information and the mobile operation state information from the terminal apparatus 4 via the communication path 5 or the different communication path, and outputs the request information and the mobile operation state information to the controller 26.

The controller 26 selects plural pieces of user interface information while assigning priorities to the plural pieces of user interface information in accordance with the operation states of the image processing apparatus 2 and the terminal apparatus 4 and the operation order (S06). For example, the controller 26 refers to the table illustrated in FIG. 5, and selects a function corresponding to the operation states of the image processing apparatus 2 and the terminal apparatus 4 and corresponding to the operation order. In the example sequence illustrated in FIG. 6, after the controller 26 detects the operation state of the image processing apparatus 2 in S04, in S05, the controller 26 detects the operation state of the terminal apparatus 4. That is, the controller 26 first receives device operation state information and detects the operation state of the image processing apparatus 2, and then receives mobile operation state information and detects the operation state of the terminal apparatus 4. Thus, it is determined that the operation order is the "operation order A". In this case, the controller 26 selects a function corresponding to the operation states of the image processing apparatus 2 and the terminal apparatus 4 and corresponding to the operation order A. In contrast, if the processing of S05 is followed by the processing of S04, the operation order is the "operation order B". That is, if the controller 26 first receives mobile operation state information and detects the operation state of the terminal apparatus 4, and then receives device operation state information and detects the operation state of the image processing apparatus 2, it is determined that the operation order is the "operation order B". In this case, the controller 26 selects a function corresponding to the operation states of the image processing apparatus 2 and the terminal apparatus 4 and corresponding to the operation order B. Then, the controller 26 outputs address data of a setting UI for setting the operation conditions of the selected function to the transmitting and receiving unit 27.

The transmitting and receiving unit 27 transmits the highest priority (top priority) user interface information (address data of a setting UI) to the terminal apparatus 4 via the communication path 5 or another communication path in the first place (S07), transmits the second highest priority user interface information to the terminal apparatus 4 via the communication path 5 or another communication path in the second place (S08), and transmits the N-th highest priority user interface information to the terminal apparatus 4 via the communication path 5 or another communication path in the N-th place (S09). Accordingly, the transmitting and receiving unit 27 transmits the plural pieces of user interface information selected by the controller 26 to the terminal apparatus 4 in descending order of priority.

The transmitting and receiving unit 43 of the terminal apparatus 4 receives the plural pieces of user interface information from the image processing apparatus 2 via the communication path 5 or another communication path, and outputs the plural pieces of user interface information, which are assigned priorities, to the controller 41 (S10). For example, the transmitting and receiving unit 43 receives plural pieces of address data setting UIs assigned priorities from the image processing apparatus 2 via the communication path 5 or another communication path, and outputs the plural pieces of address data to the controller 41.

The controller 41 causes the plural pieces of user interface information acquired from the image processing apparatus 2 to be displayed on the UI unit 44 (S11). For example, the controller 41 may cause the plural pieces of address data to be displayed as thumbnail images on the UI unit 44, or may cause the plural pieces of address data to be displayed on the UI unit 44 in descending order of priority.

Then, the user activates the web browser on the terminal apparatus 4, and specifies a desired piece of address data among the plural pieces of address data being displayed on the UI unit 44 using the UI unit 44. The transmitting and receiving unit 43 accesses data of the setting UI via the communication path 5 using the address data specified by the user. After that, the data of the setting UI is provided from the UI providing unit 24 of the image processing apparatus 2 to the UI unit 44 of the terminal apparatus 4 through the transmitting and receiving unit 27, the communication path 5, and the transmitting and receiving unit 43.

In S07 to S09, instead of transmitting address data, the transmitting and receiving unit 27 may transmit plural pieces of data of setting UIs to the terminal apparatus 4 in descending order of priority. In this case, the controller 41 of the terminal apparatus 4 causes the plural setting UIs to be displayed on the UI unit 44 in descending order of priority.

Accordingly, an information providing apparatus according to this exemplary embodiment detects the operation state of the information providing apparatus and the operation state of a terminal apparatus, and provides the terminal apparatus with plural pieces of user interface information, which are assigned priorities in accordance with the operation states of the information providing apparatus and the terminal apparatus and in accordance with the operation order, in descending order of priority. Thus, user interface information relating to the current operation states of the information providing apparatus and the terminal apparatus may be provided from the information providing apparatus to the terminal apparatus without requiring a user to perform setting on the terminal apparatus.

For example, if the information providing apparatus is implemented by the image processing apparatus 2, the image processing apparatus 2 detects the operation state of the image processing apparatus 2 and the operation state of the terminal apparatus 4, selects plural functions (image processing operations) assigned priorities in accordance with the operation states of the image processing apparatus 2 and the terminal apparatus 4 and the operation order, and provides the terminal apparatus 4 with data or address data of a setting UI for setting the operation conditions of each of the functions, in descending order of priority. That is, the image processing apparatus 2 selects plural functions expected to be executed in accordance with the operation state of each of the image processing apparatus 2 and the terminal apparatus 4, and provides the terminal apparatus 4 with the data or address data of a setting UI for setting the operation conditions of each of the functions, in descending order of probability of the functions being executed. Accordingly, the data or address data of setting UIs for functions to be executable after the current operation being performed by each of the image processing apparatus 2 and the terminal apparatus 4 has been completed is provided from the image processing apparatus 2 to the terminal apparatus 4 in descending order of probability of the functions being executed. Therefore, a setting UI for a function to be executable after the current operation has been completed may be provided from the image processing apparatus 2 to the terminal apparatus 4 without requiring a user to perform setting on the terminal apparatus 4.

For example, a setting UI for a function to be executable after the currently performed operation has been completed may be provided from the image processing apparatus 2 to the terminal apparatus 4 without requiring a user to perform setting on the terminal apparatus 4 to acquire a setting UI such as a setting UI for printing, a setting UI for reading an image, or a setting UI for facsimile transmission.

The terminal apparatus 4 may transmit mobile operation state information to the image processing apparatus 2 each time the operation state of the terminal apparatus 4 is changed. In addition, the image processing apparatus 2 may provide the terminal apparatus 4 with the data or address data of a setting UI corresponding to mobile operation state information and device operation state information each time mobile operation state information is transmitted from the terminal apparatus 4. The phrases "data that is stored in the terminal apparatus 4" and "storing of data in the terminal apparatus 4" include temporary storing of data in another server (e.g., a cloud server) through the terminal apparatus 4 depending on the operation to be performed on the terminal apparatus 4.

Furthermore, the controller 41 of the terminal apparatus 4 may store the address data (URL) selected by the user in the storage unit 45 in association with the mobile operation state information. For example, if the operation state of the terminal apparatus 4 is identical to the operation state indicated by the mobile operation state information stored in the storage unit 45, the controller 41 may display the address data associated with the mobile operation state information on the UI unit 44 in response to an instruction given by the user to acquire user interface information. That is, the terminal apparatus 4 may learn the address data selected by the user, and may display previously selected address data by priority.

First Specific Example

Next, a specific processing flow and an example of use will be described. A first specific example will be described. First, a user gives an instruction to activate a data management application by operating the UI unit 44 of the terminal apparatus 4. Then, the controller 41 activates the data management application to cause a folder to be displayed on the UI unit 44. The operation state acquisition unit 42 detects the operation state of the terminal apparatus 4, and acquires mobile operation state information indicating the "currently displaying folder" state (S03).

Then, a user brings a document to the image processing apparatus 2, and sets the document on the image processing apparatus 2. For example, the user places the document on the automatic document feeder of the image processing apparatus 2. Thus, the operation state acquisition unit 25 of the image processing apparatus 2 detects that the document has been set on the image processing apparatus 2, and outputs device operation state information indicating the "currently scanning" state to the controller 26 (S04).

Then, the request information and the mobile operation state information are transmitted from the terminal apparatus 4 to the image processing apparatus 2 via the communication path 5 or another communication path (S05). As an example, for data communication based on contactless IC card technologies such as Felica (registered trademark), a contactless IC card may be incorporated into the terminal apparatus 4, and an IC card authentication device that authenticates the contactless IC card may be included in the image processing apparatus 2. A user places the terminal apparatus 4 incorporating the contactless IC card on or near the IC card authentication device included in the image processing apparatus 2, thereby allowing radio transmission and reception between the contactless IC card and the IC card authentication device to establish communication, and the request information and the mobile operation state information are transmitted from the terminal apparatus 4 to the image processing apparatus 2.

The transmitting and receiving unit 27 of the image processing apparatus 2 receives the request information and the mobile operation state information from the terminal apparatus 4, and outputs the request information and the mobile operation state information to the controller 26. Thus, the controller 26 detects that the operation state of the terminal apparatus 4 is "currently displaying folder". Further, the controller 26 has first received the device operation state information and detected the operation state of the image processing apparatus 2, and then received the mobile operation state information and detected the operation state of the terminal apparatus 4. Thus, it is determined that the operation order is the "operation order A".

Then, the controller 26 refers to the table illustrated in FIG. 5, and selects the "Scanning to Terminal apparatus" function when in combination, the operation state of the image processing apparatus 2 is the "currently scanning" state, the operation state of the terminal apparatus 4 is the "currently displaying folder" state, and the operation order is the operation order A (S06). The transmitting and receiving unit 27 transmits the data or address data of a setting UI for setting the operation conditions of the "Scanning to Terminal apparatus" function to the terminal apparatus 4 via the communication path 5 or another communication path (S07). As an example, the address data of the setting UI is transmitted from the IC card authentication device included in the image processing apparatus 2 to the contactless IC card incorporated in the terminal apparatus 4.

The controller 41 of the terminal apparatus 4 causes the setting UI for setting the operation conditions of the "Scanning to Terminal apparatus" function or address data to be displayed on the UI unit 44 (S11). When the data of the setting UI is transmitted from the image processing apparatus 2 to the terminal apparatus 4, the user may input the operation conditions for executing the "Scanning to Terminal apparatus" function using the setting UI. Alternatively, when the address data is transmitted from the image processing apparatus 2 to the terminal apparatus 4, the user activates the web browser on the terminal apparatus 4 and specifies the address data, thereby providing the data of the setting UI from the image processing apparatus 2 to the terminal apparatus 4 via the communication path 5.

Figure 9:
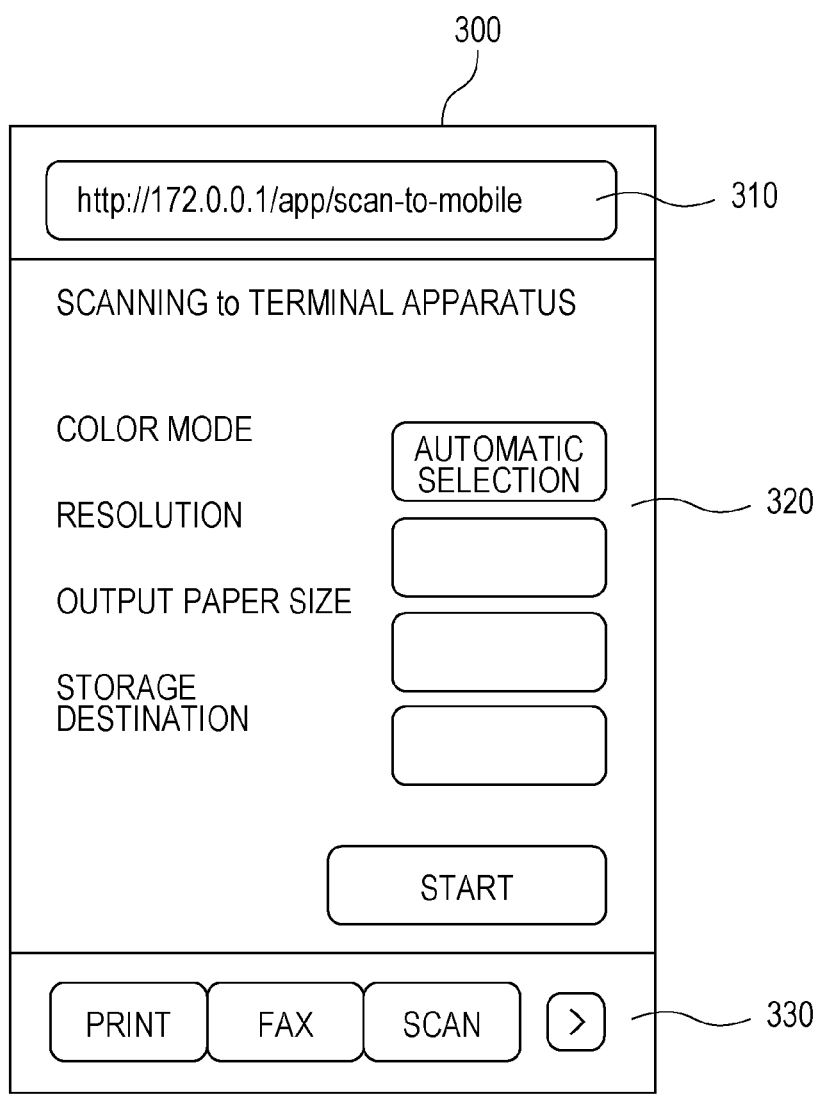
FIG. 9 illustrates an example of a setting user interface corresponding to an operation state.

FIG. 9 illustrates an example of a setting UI 300 for setting the operation conditions of the "Scanning to Terminal apparatus" function. The setting UI 300 is a screen on which a user sets the operation conditions of the image reading unit 21 using the terminal apparatus 4. The setting UI 300 includes, as an example, a display area 310 where address data (URL) is displayed, a display area 320 where setting items for reading an image are displayed, and a display area 330 used to allow the user to select setting UIs and to switch between the selected setting UIs. The display area 320 includes fields used to input a color mode, a resolution, an output size, a storage destination, and so forth. The information input by the user on the setting UI 300 is included in the control data. When the user presses the "Start" button, the transmitting and receiving unit 43 of the terminal apparatus 4 transmits the control data to the image processing apparatus 2 via the communication path 5 as an HTTP request. The controller 26 of the image processing apparatus 2 analyzes the content of the HTTP request, and outputs an instruction to the image reading unit 21 to read an image. The image reading unit 21 reads an image on the document to generate input or output data representing the image in accordance with control of the controller 26. The transmitting and receiving unit 27 of the image processing apparatus 2 transmits the input or output data generated by the image reading unit 21 to the terminal apparatus 4 via the communication path 5. The controller 41 of the terminal apparatus 4 saves the input or output data transmitted from the image processing apparatus 2 in the storage destination specified on the setting UI 300.

Second Specific Example

Next, a second specific example will be described. First, a user gives an instruction to activate an address book by operating the UI unit 44 of the terminal apparatus 4. Then, the controller 41 activates the address book to cause the destination to be displayed on the UI unit 44. The operation state acquisition unit 42 detects the operation state of the terminal apparatus 4, and acquires mobile operation state information indicating the "currently displaying destination" state (S03).

Next, the user brings a document to the image processing apparatus 2, and sets the document on the image processing apparatus 2. Thus, the operation state acquisition unit 25 of the image processing apparatus 2 detects that the document has been set on the image processing apparatus 2, and outputs device operation state information indicating the "currently scanning" state to the controller 26 (S04).

Then, the user places the terminal apparatus 4 on or near the IC card authentication device included in the image processing apparatus 2, thereby allowing the terminal apparatus 4 to transmit the request information and the mobile operation state information to the image processing apparatus 2 (S05). Thus, the controller 26 of the image processing apparatus 2 detects that the operation state of the terminal apparatus 4 is the "currently displaying destination" state. Further, the controller 26 has first received the device operation state information and detected the operation state of the image processing apparatus 2, and then received the mobile operation state information and detected the operation state of the terminal apparatus 4. Thus, it is determined that the operation order is the "operation order A".

Then, the controller 26 refers to the table illustrated in FIG. 5, and selects the "Scanning to Email" function as the highest priority function and the "Scanning to Facsimile transmission" function, which has the second highest priority, when in combination, the operation state of the image processing apparatus 2 is the "currently scanning" state, the operation state of the terminal apparatus 4 is the "currently displaying destination" state, and the operation order is the operation order A (S06). The transmitting and receiving unit 27 transmits the data or address data of a setting UI for setting the operation conditions of the highest priority "Scanning to Email" function to the terminal apparatus 4 in the first place (S07). The transmitting and receiving unit 27 further transmits the data or address data of a setting UI for setting the operation conditions of the second highest priority "Scanning to Facsimile transmission" function to the terminal apparatus 4 in the second place (S08). The controller 41 of the terminal apparatus 4 causes the setting UIs or address data to be displayed on the UI unit 44 in descending order of priority (S11). As an example, plural pieces of address data are transmitted from the IC card authentication device included in the image processing apparatus 2 to the contactless IC card incorporated in the terminal apparatus 4. The user specifies the address data corresponding to the function that the user wishes to execute among the plural pieces of address data, thereby providing the data of a setting UI for setting the operation condition of the specified function from the image processing apparatus 2 to the terminal apparatus 4 via the communication path 5.

Third Specific Example

Next, a third specific example will be described. First, a user gives an instruction to activate the data management application by operating the UI unit 44 of the terminal apparatus 4. Then, the controller 41 activates the data management application to cause a folder to be displayed on the UI unit 44. The operation state acquisition unit 42 detects the operation state of the terminal apparatus 4, and acquires mobile operation state information indicating the "currently displaying folder" state (S03).

Then, the user specifies a printing function on the UI unit 29 of the image processing apparatus 2. Thus, the operation state acquisition unit 25 of the image processing apparatus 2 detects that the printing function has been specified in the image processing apparatus 2, and outputs device operation state information indicating the "currently printing" state to the controller 26 (S04).

Then, the user places the terminal apparatus 4 on or near the IC card authentication device included in the image processing apparatus 2, thereby allowing the terminal apparatus 4 to transmit the request information and the mobile operation state information to the image processing apparatus 2 (S05). Thus, the controller 26 of the image processing apparatus 2 detects that the operation state of the terminal apparatus 4 is the "currently displaying folder" state. Further, the controller 26 has first received the device operation state information and detected the operation state of the image processing apparatus 2, and then received the mobile operation state information and detected the operation state of the terminal apparatus 4. Thus, it is determined that the operation order is the "operation order A".

Then, the controller 26 refers to the table illustrated in FIG. 5, and selects the "Printing from Terminal apparatus" function when in combination, the operation state of the image processing apparatus 2 is the "currently printing" state, the operation state of the terminal apparatus 4 is the "currently displaying folder" state, and the operation order is the operation order A (S06). The transmitting and receiving unit 27 transmits the data or address data of a setting UI for setting the operation conditions of the "Printing from Terminal apparatus" function to the terminal apparatus 4 via the communication path 5 or another communication path (S07). As an example, the address data of the setting UI is transmitted from the IC card authentication device included in the image processing apparatus 2 to the contactless IC card incorporated in the terminal apparatus 4. The controller 41 of the terminal apparatus 4 causes the setting UI for setting the operation conditions of the "Printing from Terminal apparatus" function or address data to be displayed on the UI unit 44 (S11).

Figure 10:
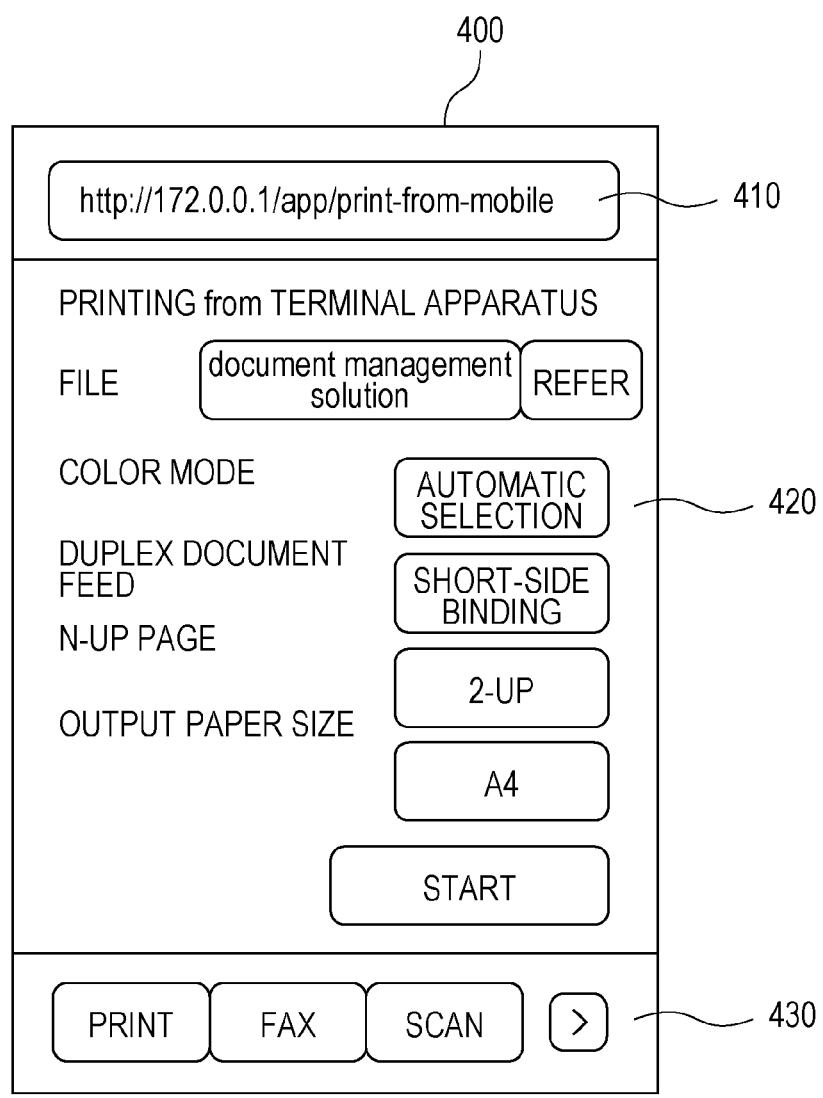
FIG. 10 illustrates an example of a setting user interface corresponding to an operation state.

FIG. 10 illustrates an example of a setting UI 400 for setting the operation conditions of the "Printing from Terminal apparatus" function. The setting UI 400 is a screen on which a user sets the operation conditions of the printing unit 22 of the image processing apparatus 2 using the terminal apparatus 4. The setting UI 400 includes, as an example, a display area 410 where address data (URL) is displayed, a display area 420 where setting items for printing are displayed, and a display area 430 used to allow the user to select setting UIs and to switch between the selected setting UIs. The display area 420 includes fields used to input a color mode, simplex/duplex printing, an output paper size, the name of data to be printed, and so forth. The information input by the user on the setting UI 400 is included in the control data. When the user selects the "Start" button, the transmitting and receiving unit 43 of the terminal apparatus 4 transmits the control data to the image processing apparatus 2 via the communication path 5 as an HTTP request. The transmitting and receiving unit 43 further transmits the data to be printed to the image processing apparatus 2 via the communication path 5. The data to be printed is stored in the storage unit 28 of the image processing apparatus 2. The controller 26 of the image processing apparatus 2 analyzes the content of the HTTP request, and outputs a printing instruction to the printing unit 22. The printing unit 22 prints an image on a sheet based on the data in accordance with control of the controller 26.

Fourth Specific Example

Next, a fourth specific example will be described. First, a user gives an instruction to activate the data management application by operating the UI unit 44 of the terminal apparatus 4. Then, the controller 41 activates the data management application to cause a folder to be displayed on the UI unit 44. The operation state acquisition unit 42 detects the operation state of the terminal apparatus 4, and acquires mobile operation state information indicating the "currently displaying folder" state (S03).

Then, the user specifies the box operation function on the UI unit 29 of the image processing apparatus 2. Thus, the operation state acquisition unit 25 of the image processing apparatus 2 detects that the box operation function has been specified in the image processing apparatus 2, and outputs device operation state information indicating the "currently handling box" state to the controller 26 (S04).

Then, the user places the terminal apparatus 4 on or near the IC card authentication device included in the image processing apparatus 2, thereby allowing the terminal apparatus 4 to transmit the request information and the mobile operation state information to the image processing apparatus 2 (S05). Thus, the controller 26 of the image processing apparatus 2 detects that the operation state of the terminal apparatus 4 is the "currently displaying folder" state. Further, the controller 26 has first received the device operation state information and detected the operation state of the image processing apparatus 2, and then received the mobile operation state information and detected the operation state of the terminal apparatus 4. Thus, it is determined that the operation order is the "operation order A".

Then, the controller 26 refers to the table illustrated in FIG. 5, and selects the "Acquisition of box document to Terminal apparatus" function when in combination, the operation state of the image processing apparatus 2 is the "currently handling box" state, the operation state of the terminal apparatus 4 is the "currently displaying folder" state, and the operation order is the operation order A (S06). The transmitting and receiving unit 27 transmits the data or address data of a setting UI for setting the operation conditions of the "Acquisition of box document to Terminal apparatus" function to the terminal apparatus 4 via the communication path 5 or another communication path (S07). As an example, the address data of the setting UI is transmitted from the IC card authentication device included in the image processing apparatus 2 to the contactless IC card incorporated in the terminal apparatus 4. The controller 41 of the terminal apparatus 4 causes the setting UI for setting the operation conditions of the "Acquisition of box document to Terminal apparatus" function or address data to be displayed on the UI unit 44 (S11).

Fifth Specific Example

Next, a fifth specific example will be described. First, a user gives an instruction to activate the data management application by operating the UI unit 44 of the terminal apparatus 4. Then, the controller 41 activates the data management application to cause a folder to be displayed on the UI unit 44. The operation state acquisition unit 42 detects the operation state of the terminal apparatus 4, and acquires mobile operation state information indicating the "currently displaying folder" state (S03).

Then, the user places the terminal apparatus 4 on or near the IC card authentication device included in the image processing apparatus 2, thereby allowing the terminal apparatus 4 to transmit the request information and the mobile operation state information to the image processing apparatus 2 (S05). Thus, the controller 26 of the image processing apparatus 2 detects that the operation state of the terminal apparatus 4 is the "currently displaying folder" state.

Since the image processing apparatus 2 has not yet been operated in this stage, the controller 26 has not detected the operation state of the image processing apparatus 2. In this case, there is no corresponding setting UI, and thus the controller 26 selects a predetermined default user interface. The transmitting and receiving unit 27 transmits the data or address data of the default user interface to the terminal apparatus 4 via the communication path 5 or another communication path. As an example, the data or address data of the default user interface is transmitted from the IC card authentication device included in the image processing apparatus 2 to the contactless IC card incorporated in the terminal apparatus 4. For example, the controller 41 of the terminal apparatus 4 causes the default user interface to be displayed on the UI unit 44.

After that, when the user specifies the box operation function using the UI unit 29 of the image processing apparatus 2, the operation state acquisition unit 25 of the image processing apparatus 2 detects that the box operation function has been specified in the image processing apparatus 2, and outputs device operation state information indicating the "currently handling box" state to the controller 26 (S04). Further, the controller 26 has first received the mobile operation state information and detected the operation state of the terminal apparatus 4, and then received the device operation state information and detected the operation state of the image processing apparatus 2. Thus, it is determined that the operation order is the "operation order B".

Then, the controller 26 refers to the table illustrated in FIG. 5, and selects the "Storage of box document from Terminal apparatus" function when in combination, the operation state of the image processing apparatus 2 is the "currently handling box" state, the operation state of the terminal apparatus 4 is the "currently displaying folder" state, and the operation order is the operation order B (S06). The transmitting and receiving unit 27 transmits the data or address data of a setting UI for setting the operation conditions of the "Storage of box document from Terminal apparatus" function to the terminal apparatus 4 via the communication path 5 or another communication path (S07). As an example, the data or address data of the setting UI is transmitted from the IC card authentication device included in the image processing apparatus 2 to the contactless IC card incorporated in the terminal apparatus 4. The controller 41 of the terminal apparatus 4 causes the setting UI for setting the operation conditions of the "Storage of box document from Terminal apparatus" function or address data to be displayed on the UI unit 44 (S11).

Hardware Configuration

The image processing apparatus 2 discussed above by way of example includes a processor such as a central processing unit (CPU) (not illustrated). The processor executes a program stored in a memory (not illustrated) to implement the respective functions of the UI providing unit 24, the operation state acquisition unit 25, and the controller 26. The program is stored in a storage device such as a hard disk drive (HDD) through a recording medium such as a compact disc (CD) or a digital versatile disc (DVD) or via a communication path such as a network. The program may be stored in advance in a storage device such as a hard disk drive. The program stored in a storage device such as a hard disk drive is read by a memory such as a random access memory (RAM) and is executed by a processor such as a CPU to implement the respective functions of the UI providing unit 24, the operation state acquisition unit 25, and the controller 26 described above.

The terminal apparatus 4 discussed above by way of example includes a processor such as a CPU (not illustrated). The processor executes a program stored in a memory (not illustrated) to implement the respective functions of the controller 41 and the operation state acquisition unit 42. The program is stored in the memory through a recording medium such as a CD or DVD or via a communication path such as a network. The program may be stored in the memory in advance. In addition, if the terminal apparatus 4 is connected to the image processing apparatus 2 via the communication path 5 or anther communication path, a program for implementing the function of the operation state acquisition unit 42 may be transmitted from the image processing apparatus 2 to the terminal apparatus 4, and may be stored in the memory of the terminal apparatus 4. The program stored in the memory is executed by the processor such as a CPU to implement the respective functions of the controller 41 and the operation state acquisition unit 42 described above.

First Modification

Next, a description will be made of an information providing apparatus, an information providing system, and a program according to a first modification. The information providing system according to the first modification includes an information providing apparatus, a relay device, and a terminal apparatus. The information providing apparatus and the terminal apparatus are connected to each other via the relay device, and user interface information is provided from the information providing apparatus to the terminal apparatus via the relay device.

Figure 11:
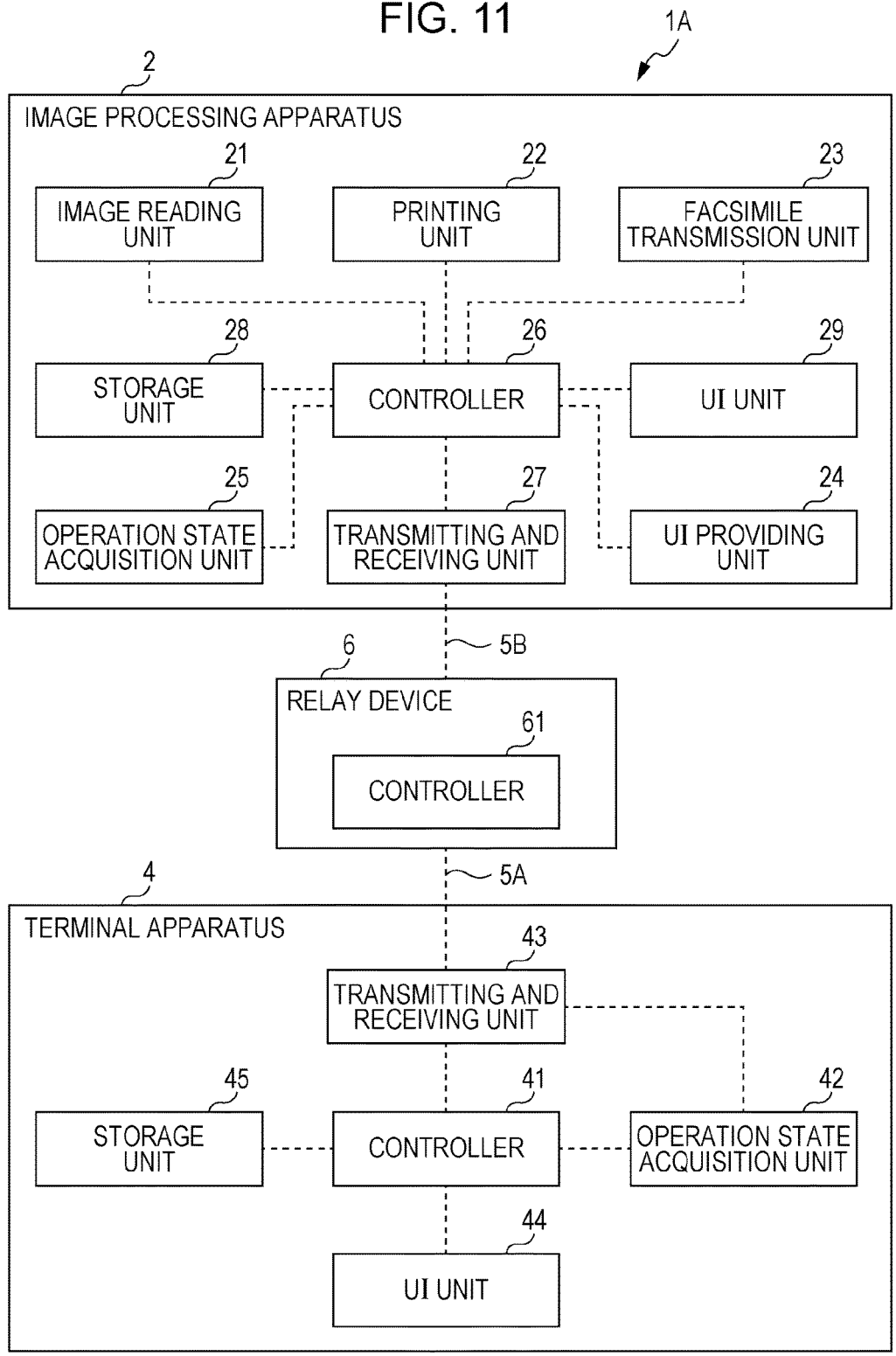
FIG. 11 is a block diagram illustrating an image processing system according to a first modification.

FIG. 11 illustrates an example of an image processing system 1A according to the first modification. The image processing system 1A includes an image processing apparatus 2, a terminal apparatus 4, and a relay device 6. The terminal apparatus 4 and the relay device 6 are connected to each other via a communication path 5A, and the image processing apparatus 2 and the relay device 6 are connected to each other via a communication path 5B. The image processing apparatus 2 and the terminal apparatus 4 transmit and receive data to and from each other via the relay device 6. An information providing apparatus according to the first modification may be implemented by the image processing apparatus 2, by way of example, and an information providing system according to the first modification may be implemented by the image processing apparatus 2, the terminal apparatus 4, and the relay device 6, by way of example. The image processing system 1A according to the first modification is different from the image processing system 1 according to the exemplary embodiment described above in that the relay device 6 is provided.

The communication paths 5A and 5B are substantially the same as the communication path 5 described above. The terminal apparatus 4 and the relay device 6 may be connected to each other via a communication path different from the communication path 5A, and the image processing apparatus 2 and the relay device 6 may be connected to each other via a communication path different from the communication path 5B. Similarly to the exemplary embodiment described above, the different communication paths may be communication paths used for direct connection. In addition, the terminal apparatus 4 and the relay device 6 may be connected to each other via two communication paths, that is, the communication path 5A and another communication path, and the image processing apparatus 2 and the relay device 6 may be connected to each other via two communication paths, that is, the communication path 5B and another communication path.

The relay device 6 may be, as an example, a proxy server, and includes a controller 61. The relay device 6 receives request information and mobile operation state information from the terminal apparatus 4 via the communication path 5A or another communication path. The relay device 6 requests the image processing apparatus 2 to acquire plural pieces of user interface information to be provided to the terminal apparatus 4 under control of the controller 61. The relay device 6 receives plural pieces of user interface information, which are assigned priorities, from the image processing apparatus 2 via the communication path 5B or another communication path. Then, the relay device 6 transmits the plural pieces of user interface information, which are assigned priorities, to the terminal apparatus 4 via the communication path 5A or another communication path.

The operation of the image processing system 1A according to the first modification will be described with reference to FIG. 12. FIG. 12 is a sequence diagram illustrating an example of the procedure of a process performed by the image processing system 1A.

First, a user gives an instruction to activate specific application software using the UI unit 44 of the terminal apparatus 4. Then, the controller 41 of the terminal apparatus 4 activates the application software specified by the user. Then, the user performs an operation using the application software, and gives an instruction to acquire user interface information relating to the operation using the UI unit 44 of the terminal apparatus 4 (S20). Then, the controller 41 requests the operation state acquisition unit 42 to acquire the user interface information. The operation state acquisition unit 42 detects the state of the operation being performed in the terminal apparatus 4 (S21), and outputs request information and mobile operation state information to the transmitting and receiving unit 43.

When the user performs an operation on the image processing apparatus 2, the operation state acquisition unit 25 of the image processing apparatus 2 detects the state of the operation being performed on the image processing apparatus 2, and outputs device operation state information to the controller 26 (S22).

Then, the transmitting and receiving unit 43 of the terminal apparatus 4 transmits the request information and the mobile operation state information to the relay device 6 via the communication path 5A or another communication path (S23). The relay device 6 receives the request information and the mobile operation state information from the terminal apparatus 4 via the communication path 5A or another communication path. Then, the relay device 6 transmits the request information and the mobile operation state information to the image processing apparatus 2 via the communication path 5B or another communication path.

Then, the relay device 6 sends a request for the highest priority (top priority) user interface information to the image processing apparatus 2 via the communication path 5B or another communication path (S24). The image processing apparatus 2 selects plural pieces of user interface information while assigning priorities to the plural pieces of user interface information in accordance with the operation state of each of the image processing apparatus 2 and the terminal apparatus 4 in accordance with the operation order, and transmits the highest priority (top priority) user interface information to the relay device 6 via the communication path 5B or another communication path (S25). Then, the relay device 6 sends a request for the second highest priority user interface information to the image processing apparatus 2 via the communication path 5B or another communication path (S26). The image processing apparatus 2 transmits the second highest priority user interface information to the relay device 6 via the communication path 5B or another communication path (S27). Then, the relay device 6 sends a request for the N-th highest priority user interface information to the image processing apparatus 2 via the communication path 5B or another communication path (S28). The image processing apparatus 2 transmits the N-th highest priority user interface information to the relay device 6 via the communication path 5B or another communication path (S29). Accordingly, the relay device 6 sends a request for plural pieces of user interface information to the image processing apparatus 2 in descending order of priority, and the image processing apparatus 2 transmits the user interface information to the relay device 6 in descending order of priority in accordance with the respective requests. Then, the relay device 6 transmits the plural pieces of user interface information assigned priorities to the terminal apparatus 4 via the communication path 5A or another communication path (S30).

The transmitting and receiving unit 43 of the terminal apparatus 4 receives the plural pieces of user interface information from the relay device 6 via the communication path 5A or another communication path, and outputs the plural pieces of user interface information to the controller 41. For example, the transmitting and receiving unit 43 receives plural pieces of address data of setting UIs, which are assigned priorities, from the relay device 6 via the communication path 5A or another communication path, and outputs the plural pieces of address data assigned priorities to the controller 41. The controller 41 causes the plural pieces of user interface information acquired from the relay device 6 to be displayed on the UI unit 44 (S31). The operation after S31 is substantially the same as that of the image processing system 1 according to the foregoing exemplary embodiment, and a description thereof is thus omitted.

Second Modification

Next, a description will be made of an information providing apparatus, an information providing system, and a program according to a second modification. The information providing system according to the second modification includes an information providing apparatus, an operation state database (DB), and a terminal apparatus. The information providing apparatus, the operation state DB, and the terminal apparatus are connected to one another via a communication path.

FIG. 13 illustrates an example of an image processing system 1B according to the second modification. The image processing system 1B includes an image processing apparatus 2, a terminal apparatus 4, and an operation state database (DB) 7. The image processing apparatus 2 and the terminal apparatus 4 are connected to each other via a communication path 5C, and the terminal apparatus 4 and the operation state DB 7 are connected to each other via a communication path 5D. Further, the image processing apparatus 2 and the operation state DB 7 are connected to each other via a communication path 5E. The information providing apparatus according to the second modification may be implemented by the image processing apparatus 2, by way of example, and the information providing system according to the second modification may be implemented by the image processing apparatus 2, the terminal apparatus 4, and the operation state DB 7, by way of example. The image processing system 1B according to the second modification is different from the image processing system 1 according to the exemplary embodiment described above in that the operation state DB 7 is provided.

The communication paths 5C, 5D, and 5E are substantially the same as the communication path 5 described above. The image processing apparatus 2 and the terminal apparatus 4 may be connected to each other via a communication path different from the communication path 5C, and the terminal apparatus 4 and the operation state DB 7 may be connected to each other via a communication path different from the communication path 5D. Further, the image processing apparatus 2 and the operation state DB 7 may be connected to each other via a communication path different from the communication path 5E. Similarly to the exemplary embodiment described above, the different communication paths may be communication paths used for direct connection. In addition, the image processing apparatus 2 and the terminal apparatus 4 may be connected to each other via two communication paths, that is, the communication path 5C and another communication path, and the terminal apparatus 4 and the operation state DB 7 may be connected to each other via two communication paths, that is, the communication path 5D and another communication path. Further, the image processing apparatus 2 and the operation state DB 7 may be connected to each other via two communication paths, that is, the communication path 5E and another communication path.

The operation state DB 7 receives mobile operation state information from the terminal apparatus 4, and stores the received mobile operation state information. For example, the operation state DB 7 stores the mobile operation state information in association with request information. Upon receipt of request information from the terminal apparatus 4, the image processing apparatus 2 acquires mobile operation state information associated with the request information from the operation state DB 7.

The operation of the image processing system 1B according to the second modification will be described with reference to FIG. 14. FIG. 14 is a sequence diagram illustrating an example of the procedure of a process performed by the image processing system 1B.

First, a user gives an instruction to activate specific application software using the UI unit 44 of the terminal apparatus 4. Then, the controller 41 of the terminal apparatus 4 activates the application software specified by the user. Then, the user performs an operation using the application software, and gives an instruction to acquire user interface information relating to the operation using the UI unit 44 of the terminal apparatus 4 (S40). Then, the controller 41 requests the operation state acquisition unit 42 to acquire the user interface information (S41). The operation state acquisition unit 42 detects the state of the operation being performed on the terminal apparatus 4 (S42), and outputs request information and mobile operation state information to the transmitting and receiving unit 43.

The transmitting and receiving unit 43 of the terminal apparatus 4 transmits the request information and the mobile operation state information to the operation state DB 7 via the communication path 5D, and registers the operation state in the operation state DB 7 (S43). The operation state DB 7 stores the mobile operation state information in association with the request information. The transmitting and receiving unit 43 may transmit the request information and the mobile operation state information to the operation state DB 7 via a communication path different from the communication path 5D.

When the user performs an operation on the image processing apparatus 2, the operation state acquisition unit 25 of the image processing apparatus 2 detects the state of the operation being performed on the image processing apparatus 2, and outputs device operation state information to the controller 26 (S44).

Then, the transmitting and receiving unit 43 of the terminal apparatus 4 transmits the request information to the image processing apparatus 2 via the communication path 5C (step S45). The transmitting and receiving unit 43 may transmit the request information to the image processing apparatus 2 via a communication path different from the communication path 5C.

The transmitting and receiving unit 27 of the image processing apparatus 2 receives the request information from the terminal apparatus 4 via the communication path 5C or another communication path, and outputs the request information to the controller 26. The controller 26 acquires the mobile operation state information relating to the request information from the operation state DB 7 via the transmitting and receiving unit 27 and the communication path 5E (step S46).

The controller 26 selects plural pieces of user interface information while assigning priorities to the plural pieces of user interface information in accordance with the operation state of each of the image processing apparatus 2 and the terminal apparatus 4 and in accordance with the operation order. Then, the transmitting and receiving unit 27 transmits the highest priority (top priority) user interface information to the terminal apparatus 4 via the communication path 5C or another communication path (S47), transmits the second highest priority user interface information to the terminal apparatus 4 via the communication path 5C or another communication path (S48), and transmits the N-th highest priority user interface information to the terminal apparatus 4 via the communication path 5C or another communication path (S49). Accordingly, the transmitting and receiving unit 27 transmits the plural pieces of user interface information selected by the controller 26 to the terminal apparatus 4 in descending order of priority.

The transmitting and receiving unit 43 of the terminal apparatus 4 receives the plural pieces of user interface information from the image processing apparatus 2 via the communication path 5C or another communication path, and outputs the plural pieces of user interface information to the controller 41 (step S50). For example, the transmitting and receiving unit 43 receives plural pieces of address data of setting UIs, which are assigned priorities, from the image processing apparatus 2 via the communication path 5C or another communication path, and outputs the plural pieces of address data assigned priorities to the controller 41. The controller 41 causes the plural pieces of user interface information acquired from the image processing apparatus 2 to be displayed on the UI unit 44 (S51). The operation after S51 is substantially the same as that of the image processing system 1 according to the foregoing exemplary embodiment, and a description thereof is thus omitted.

Accordingly, as in the exemplary embodiment described above, the image processing apparatus 2 according to the first and second modifications provides the terminal apparatus 4 with the data or address data of setting UIs for functions to be executable after the current operations being performed on the image processing apparatus 2 and the terminal apparatus 4 have been completed, in descending order of probability of the functions being executed. Therefore, a setting UI for a function to be executable after the current operation has been completed may be provided from the image processing apparatus 2 to the terminal apparatus 4 without requiring a user to perform setting on the terminal apparatus 4.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information providing apparatus comprising:
   a processor configured to execute:
      an image processing unit configured to execute image processing;
      a receiving unit configured to receive first operation state information from a terminal apparatus connected to the information providing apparatus via a communication path, the first operation state information indicating a state of an operation currently being performed, according to a first instruction from a user, using application software operating on the terminal apparatus;
      an acquiring unit configured to acquire second operation state information indicating which kind of function is currently being executed by the image processing unit according to a second instruction from the user;
   a selection unit configured to select, upon detecting that the terminal apparatus is in a specific operation state relating to image processing in accordance with the first operation state information, one or more pieces of user interface information concerning image processing to be displayed following the specific operation state, in accordance with a combination of the first operation state information and the second operation state information; and
      a transmitting unit configured to transmit the one or plurality of pieces of user interface information selected by the selection unit to the terminal apparatus.

2. The information providing apparatus according to claim 1, wherein
   the selection unit is configured to select the one or plurality of pieces of user interface information in accordance with an order in which the terminal apparatus and the image processing unit were operated and in accordance with the first operation state information and the second operation state information.

3. The information providing apparatus according to claim 1, wherein
   the transmitting unit is configured to transmit address data of a user interface for allowing the terminal apparatus to transmit command data relating to image processing, to the terminal apparatus as the one or plurality of pieces of user interface information.

4. The information providing apparatus according to claim 1, wherein
   the transmitting unit is configured to transmit data of a user interface for allowing the terminal apparatus to transmit command data relating to image processing, to the terminal apparatus as the one or plurality of pieces of user interface information.

5. The information providing apparatus according to claim 1, wherein the transmitting unit is configured to, in response to the transmitting unit transmitting more than one piece of user interface information, transmit the pieces of user interface information to the terminal apparatus in accordance with priorities assigned to the pieces of user interface information and based on levels of probability of image processing being executed, the priorities being assigned to the pieces of user interface information in accordance with an operation state of the terminal apparatus and an operation state of the image processing unit, and
   wherein the priorities are levels of probability of image processing being executed in accordance with the operation state of the terminal apparatus and the operation state of the image processing unit.

6. The information providing apparatus according to claim 1, wherein
   the first operation state information indicates the application software currently being executed on the terminal apparatus.

7. The information providing apparatus according to claim 1, wherein
   the first operation state information indicates content of an operation currently being performed on the terminal apparatus using the application software.

8. The information providing apparatus according to claim 1, wherein the selection unit is configured to select the one or more pieces of user interface information by cross-referencing the first operation state information with the second operation state information.

9. The information providing apparatus according to claim 1, wherein the information providing apparatus further includes a table that cross references operation state information of the terminal apparatus with operation state information of the information providing apparatus, and the selection unit is configured to refer to the first operation state information and the second operation state information to select the one or more pieces of user interface information from the table.

10. The information providing apparatus according to claim 1, wherein the first operation state information indicates a type of information currently being displayed by the terminal apparatus.

11. The information providing apparatus according to claim 1, wherein in response to the transmitting unit transmitting more than one piece of user interface information, the transmitting unit transmits the pieces of user interface information to the terminal apparatus in accordance with priorities assigned to the pieces of user interface information, the priorities being assigned to the pieces of user interface information in accordance with an operation state of the terminal apparatus and an operation state of the image processing unit.

12. The information providing apparatus according to claim 1, wherein the kind of function currently being executed by the image processing unit according to the second instruction of the user is one of scanning, setting a destination, printing, and handling box, and
   wherein the state of the operating currently being performed, according to the first instruction from the user, using the application software operating on the terminal apparatus is one of displaying a file, displaying a folder, creating an email, and displaying a destination.

13. A non-transitory computer readable medium storing a program causing a computer to execute a process, the process comprising:
   receiving first operation state information from a terminal apparatus connected via a communication path to an information providing apparatus that executes image processing, the first operation state information indicating a state of an operation currently being performed, according to a first instruction from a user, using application software operating on the terminal apparatus;
   acquiring second operation state information indicating which kind of function is currently being executed by the information providing apparatus according to second instruction from the user;
   selecting, upon detecting that the terminal apparatus is in a specific operation state relating to image processing in accordance with the first operation state information, one or a plurality of pieces of user interface information concerning image processing to be displayed following the specific operation state, in accordance with a combination of the first operation state information and the second operation state information; and transmitting the selected one or plurality of pieces of user interface information to the terminal apparatus.

14. The non-transitory computer readable medium according to claim 13, wherein selecting the one or more pieces of user interface information is performed by cross-referencing the first operation state information with the second operation state information.

15. The non-transitory computer readable medium according to claim 13, wherein the process further includes:

storing a table that cross references operation state information of the terminal apparatus with operation state information of the information providing apparatus; and referring to the first operation state information and the second operation state information in order to select the one or more pieces of user interface information from the table.

16. The non-transitory computer readable medium according to claim 13, wherein the first operation state information indicates a type of information currently being displayed by the terminal apparatus.

17. An information providing apparatus comprising:
a processor configured to execute:

an image processing unit configured to execute image processing;

a receiving unit configured to receive first operation state information from a terminal apparatus connected to the information providing apparatus via a communication path, the first operation state information indicating a state of an operation being performed, according to a first instruction from a user, using application software operating on the terminal apparatus;

an acquiring unit configured to acquire second operation state information indicating which kind of function is being executed by the image processing unit according to a second instruction from the user;

a selection unit configured to select, upon detecting that the terminal apparatus is in a specific operation state relating to image processing in accordance with the first operation state information, one or more pieces of user interface information concerning image processing to be displayed following the specific operation state, in accordance with a combination of the first operation state information and the second operation state information; and a transmitting unit configured to transmit the one or plurality of pieces of user interface information selected by the selection unit to the terminal apparatus.

* * * * *